US012738645B2

(12) United States Patent
Salazar et al.

(10) Patent No.: US 12,738,645 B2
(45) Date of Patent: Sep. 15, 2026

(54) SYSTEM AND METHOD OF PROVIDING A WIRELESS ROUTER

(71) Applicant: Space Exploration Technologies Corp., Hawthorne, CA (US)

(72) Inventors: Joshua S. Salazar, Los Angeles, CA (US); Ignacy Chorazewicz, Los Angeles, CA (US); Brandon Toy, San Jose, CA (US)

(73) Assignee: Space Exploration Technologies Corp., Starbase, TX (US)

( * ) Notice: Subject to any disclaimer, the term of this patent is extended or adjusted under 35 U.S.C. 154(b) by 413 days.

(21) Appl. No.: 18/223,464

(22) Filed: Jul. 18, 2023

(65) Prior Publication Data

US 2024/0030601 A1 Jan. 25, 2024

Related U.S. Application Data

(60) Provisional application No. 63/391,668, filed on Jul. 22, 2022.

(51) Int. Cl.
*H01Q 3/24* (2006.01)
*H01Q 3/36* (2006.01)
*H01Q 25/04* (2006.01)

(52) U.S. Cl.
CPC ............... *H01Q 3/36* (2013.01); *H01Q 25/04* (2013.01)

(58) Field of Classification Search
CPC ........... H01Q 3/36; H01Q 3/24; H01Q 25/04; H01Q 1/007
See application file for complete search history.

(56) References Cited

U.S. PATENT DOCUMENTS

| | | | | |
|---|---|---|---|---|
| 2013/0229999 A1* | 9/2013 | Da Silva | H04B 7/04 370/329 |
| 2016/0255605 A1* | 9/2016 | Kyeong | H04B 7/0413 370/329 |
| 2017/0033853 A1* | 2/2017 | Kim | H04B 7/0617 |
| 2018/0287255 A1* | 10/2018 | Zimmerman | H01Q 3/08 |
| 2020/0205012 A1* | 6/2020 | Bengtsson | H04B 7/0413 |
| 2020/0383308 A1* | 12/2020 | Brame | F16B 2/06 |
| 2023/0361461 A1* | 11/2023 | Horn | H01Q 21/061 |
| 2025/0007181 A1* | 1/2025 | Guan | H01Q 1/125 |

* cited by examiner

*Primary Examiner* — Awat M Salih
(74) *Attorney, Agent, or Firm* — Polsinelli PC

(57) ABSTRACT

Disclosed are various systems and methods for addressing the efficiency issues discussed in the application. An example system includes a control system, a vertical array antenna having a plurality of antennas that generates a planar zone beam, an omni-directional antenna, a switch for switching, as managed by the control system, between the vertical array antenna and the omni-directional antenna; and a beamforming component that provides, as managed by the control system, beamforming of the planar zone beam. The vertical array antenna can include multiple high gain antennas that produce an antenna gain for the planar zone beam of between 12 and 22 dBi.

22 Claims, 16 Drawing Sheets

SYSTEM AND METHOD OF PROVIDING A WIRELESS ROUTER

FIELD

The present application claims priority to U.S. Provisional Patent Application No. 63/391,668 filed on Jul. 22, 2022, entitled "SYSTEM AND METHOD OF PROVIDING A WIRELESS ROUTER", the contents of which are incorporated herein by reference.

FIELD

The present disclosure pertains to wireless communication technology and, in particular, to wireless routing technology that includes a vertical array antenna, an omni-directional antenna and a control system for switching between the two different antenna types or antennas.

BACKGROUND

Computing devices are designed to at least one of send or receive data from other computing devices via networks. At a basic level, a network may be viewed as at least one computing device electrically coupled to another computing device via a routing or switching device (e.g., a router). A network may be expanded by adding additional routers that are connected to the existing routers. The additional routers can be coupled to their own computing devices. Networks may communicate with other remote networks and devices via the Internet. (The Internet itself may be viewed as a large, worldwide network). For example, a cable modem at a house may be connected to the Internet and to a router at the house, and the router may be connected to one or more computing devices. The computing devices may communicate with the Internet via the router and the cable modem.

One wireless communication protocol is called Wi-Fi, which is typically implemented via a Wi-Fi router. The details of the Wi-Fi protocol are known to be outlined in the Institute of Electrical and Electronics Engineers (IEEE) 802.11 standard and its various versions. Most consumer Wi-Fi routers today have omni-directional antennas that can communicate with client devices such as mobile phones and laptop computers in any direction. However, the conventional approach sends energy in all directions even when there are no client devices in a particular direction. For example, a Wi-Fi router in a house may send RF energy to the attic, sub-floor and side yard where there are no client devices. The extra energy is wasteful and requires more power to radiate and also increases the chances for interference with nearby client devices using the same electromagnetic spectrum. Some client devices and/or routers add low-levels of beamforming (~3 dB) to increase the directivity of the energy to a user and end with an antenna gain around 6 to 8 dBi. More recent versions of Wi-Fi allow for beamforming but provide the feature at low power levels.

SUMMARY

What is needed in the art is an improved structure for a Wi-Fi router or any wireless communication device that improves the efficiency of the device particularly with respect to the use of the radiated signal energy.

Disclosed are various systems and methods for addressing the efficiency issues raised above. An example system includes a control system, a vertical array antenna having a plurality of antennas that generates a planar zone beam, an omni-directional antenna, a switch for switching, as managed by the control system, between the vertical array antenna and the omni-directional antenna; and a beamforming component that provides, as managed by the control system, beamforming of the planar zone beam. The vertical array antenna can include multiple high gain antennas that produce an antenna gain for the planar zone beam of between 12 and 22 dBi.

In one aspect, the vertical array antenna can include a first vertical array antenna pointed in a first direction and a second vertical array antenna pointed in a second direction. The beamforming component can include a respective analog phase shifter configured inline with a respective antenna of the vertical array antenna.

In one aspect, the plurality of antennas can include a plurality of high gain antennas. The vertical array antenna can be switched between a high gain mode and a low gain mode, wherein the high gain mode has more antennas of the plurality of antennas turned on than in the low gain mode.

In one aspect, switching to the low gain mode can include turning off at least some antennas of the plurality of antennas.

The vertical array antenna can be configured in a generally vertical position within the wireless router. The omni-directional antenna can have an antenna gain of between 2 and 7 dBi inclusive.

In another aspect, the beamforming component can include a hybrid of analog and digital beamforming of the planar zone beam.

The system can further include a front-end module. The beamforming component can include performing operations including one or more of integrating analog phase shifters into the front-end module and configuring a respective analog phase shifter inline with each respective antenna path of the plurality of antennas.

Another embodiment can be a method. An example method can include transmitting, via a wireless router and in a low gain mode, a broadcast signal via a low-level planar zone beam, wherein the wireless router comprises a control system, a vertical array antenna having a plurality of antennas that generates a planar zone beam, an omni-directional antenna, a switch for switching, as managed by the control system, between the vertical array antenna and the omni-directional antenna and a beamforming component that provides, as managed by the control system, beamforming of the planar zone beam, establishing communication, via the wireless router and based on the broadcast signal, with one or more client devices, switching, via the control system of the wireless router, to a high gain mode and communicating with each of the one or more client devices via a respective beam formed in the high gain mode by the beamforming component.

In one aspect, a system can include at least one processor; a control system in communication with the at least one processor; a vertical array antenna having a plurality of antennas that generates a planar zone beam; an omni-directional antenna; a switch for switching, as managed by the control system, between the vertical array antenna and the omni-directional antenna; a beamforming component that provides, as managed by the control system, beamforming of the planar zone beam; and a computer-readable storage device storing instructions which, when executed by the at least one processor, cause the at least one processor to perform operations. The operations can include one or more of transmitting, in a low gain mode, a broadcast signal via a low-level planar zone beam; establishing communication, based on the broadcast signal, with one or more client devices; switching, via the control system, to a high gain mode; and communicating with each of the one or more client devices via a respective beam formed in the high gain mode by the beamforming component.

Another example method can include transmitting, via a wireless router having a control system and a vertical array antenna having a plurality of antennas, a planar zone beam having generally a donut shape, establishing communication, via the wireless router, with a client device and adjusting, via the control system, a beamform of the planar zone beam based on a location of the client device to project energy to the client device.

In another aspect, a system can include at least one processor; a control system; a vertical array antenna having a plurality of antennas; and a computer-readable storage device storing instructions which, when executed by the at least one processor, cause the at least one processor to perform operations. The operations can include one or more of transmitting, via the control system and the vertical array antenna, a planar zone beam having generally a donut shape; establishing communication with a client device; and adjusting, via the control system, a beamform of the planar zone beam based on a location of the client device to project energy to the client device.

In another aspect, a method can include transmitting, via a wireless router having a control system, a switch, an omni-directional antenna and a vertical array antenna having a plurality of antennas, an omni-directional signal from the omni-directional antenna. receiving data associated with one or more of a client device, a time of day, a network communication path, a bandwidth, based on the data and via the switch as managed by the control system, switching from the omni-directional antenna to the vertical array antenna and transmitting a planar zone beam from the vertical array antenna.

In another aspect can include at least one processor; a control system; an omni-directional antenna; a vertical array antenna having a plurality of antennas; and a computer-readable storage device storing instructions which, when executed by the at least one processor, cause the at least one processor to perform operations. The operations can include one or more of transmitting an omni-directional signal from the omni-directional antenna; receiving data associated with one or more of a client device, a time of day, a network communication path, a bandwidth; based on the data and as managed by the control system, switching from the omni-directional antenna to the vertical array antenna; and transmitting a planar zone beam from the vertical array antenna.

Another example system can include a first wireless router comprising a first control system, a first vertical array antenna having a first plurality of antennas that generates a first planar zone beam, a first omni-directional antenna, a first switch for switching, as managed by the first control system, between the first vertical array antenna and the first omni-directional antenna and a first beamforming component that provides, as managed by the first control system, beamforming of the first planar zone beam and a second wireless router comprising a second control system, a second vertical array antenna having a second plurality of antennas that generates a second planar zone beam, a second omni-directional antenna, a second switch for switching, as managed by the second control system, between the second vertical array antenna and the second omni-directional antenna and a second beamforming component that provides, as managed by the second control system, beamforming of the second planar zone beam.

The system can further include a control system in communication with the first wireless router and the second wireless router, wherein the control system switches between the first wireless router and the second wireless router for providing network service to one or more client devices.

Another example system can include a control system, a first vertical array antenna having a first plurality of antennas that generates a first beam that is fixed, a second vertical array antenna having a second plurality of antennas that generates a second beam that is fixed, an omni-directional antenna and a switch for switching, as managed by the control system, between the first vertical array antenna, the second vertical array antenna, and the omni-directional antenna based on data associated with one or more client devices.

Another example method can include establishing communication, via a central control system, with a first wireless router and a second wireless router, wherein each of the first wireless router and the second wireless router comprises a respective vertical array antenna, wherein the first wireless router has a first configuration, receiving data related to a client device and providing, from the central control system, a control signal to the first wireless router to adjust the first configuration into a second configuration, wherein the first wireless router establishes communication with the client device in the second configuration.

In another aspect, a system can include at least one processor; a control system in communication with the at least one processor; and a computer-readable storage device storing instructions which, when executed by the at least one processor, cause the at least one processor to perform operations. The operations can include one or more of establishing communication, via the control system, with a first wireless router and a second wireless router, wherein each of the first wireless router and the second wireless router comprises a respective vertical array antenna, wherein the first wireless router has a first configuration; receiving data related to a client device; and providing, from the control system, a control signal to the first wireless router to adjust the first configuration into a second configuration, wherein the first wireless router establishes communication with the client device in the second configuration.

Another example method can include establishing communication, via a first wireless router, with a central control system, wherein a second wireless router also is in communication with the central control system, wherein each of the first wireless router and the second wireless router comprises a respective vertical array antenna, wherein the first wireless router has a first configuration and receiving, at the first wireless router and from the central control system, a control signal to adjust the first configuration into a second configuration, wherein the central control system generates the control signal based on data received about a client device and wherein the first wireless router establishes communication with the client device in the second configuration.

In another aspect, a system can include at least one processor; a control system in communication with the at least one processor; a first wireless router in communication with the control system; and a computer-readable storage device storing instructions which, when executed by the at least one processor, cause the at least one processor to perform operations. The operations can include establishing communication, via the first wireless router with the control system, wherein a second wireless router also is in communication with the control system, wherein each of the first wireless router and the second wireless router comprises a respective vertical array antenna, wherein the first wireless router has a first configuration; and receiving, at the first wireless router and from the control system, a control signal to adjust the first configuration into a second configuration, wherein the control system generates the control signal based on data received about a client device and wherein the first wireless router establishes communication with the client device in the second configuration.

Other embodiments can include computer-readable storage devices storing instructions which, when executed by at least one processor, cause the at least one processor to perform any of the operations. methods or functions disclosed herein. In another aspect, embodiments can include a system including means for performing any one or more of the methods, functions or operations disclosed herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
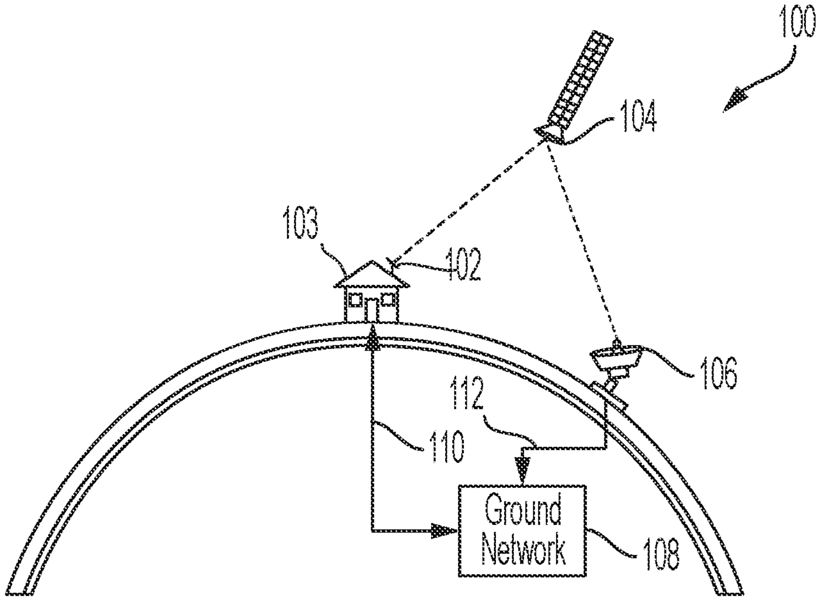
FIG. 1 is a not-to-scale diagram illustrating a simple example of communication in a satellite communication system in accordance with embodiments of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some aspects, such features may be arranged in a different manner and/or order than shown in the illustrative figures. Additionally, the inclusion of a structural or method feature in a particular figure is not meant to imply that such feature is required in all embodiments and, in some aspects, it may not be included or may be combined with other features.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

Embodiments of the present disclosure are directed to systems and methods for wireless routing of signals in a network. As will be described further herein, the systems and methods of the present disclosure may provide advantages over conventional wireless routing systems and methods such as increased signal to noise ratio (SNR), reduced interference, and stronger signals. The systems and methods provide these advantages relative to conventional wireless routing systems by incorporating various types of beamforming into wireless routers.

Wireless Routing

Wireless routing systems may be implemented in any local area network in which wireless routing is desired. For example, wireless routing systems may be implemented in a home or office. While some communication devices include low-levels of beamforming such as in some versions of the Wi-Fi protocol, the increase the directivity of the energy to a client device and ultimately implement an antenna gain of around 6-8 dBi. Disclosed herein are a number of different improvements related to the use of beamforming and the ability to dynamically switch different configurations of a wireless router (or similar communication device). For example, the system or wireless router can switch between different antenna configurations to enable a more efficient use of energy. The system or wireless router can include higher gain antennas which provide antenna gains above 12 dBi. The term "dBi" refers to decibels (dB) per isotropic dB which is a measure of the forward gain of an antenna or the gain in power emitted by an antenna signal. This disclosure also introduces an approach of utilizing a vertical array antenna that produces a beam pattern such as a circularized fan beam or skinny donut beam and including a beamforming feature in addition to the beam pattern. The wireless router further includes at least one high gain antenna array, at least one omni-directional antenna and a control system to switch between the use of the different antennas. To achieve a more efficient beamforming operation, the wireless router can utilize integrated analog phase shifters into a front-end module that are configured inline with each respective antenna path.

The wireless router disclosed herein is typically connected to a modem that in turn enables a communication path between a client device and a network such as the Internet. The communication path can be provided in a number of different ways. In one example, a ground-based path such as a coaxial or fiber-optic cable can be provided to enable the client device to access servers on the network and exchange data. Thus, while there is a wireless communication between the router and the client device, the rest of the communication path to a server on the network can be wired or ground-based. In other embodiments, a cellular system may provide a wireless pathway to the network. Another wireless pathway can be established through a satellite network. These various networks will be first introduced and then the disclosure will return to add further details of the structure and use of the communication device.

In some aspects, wireless routing systems of the present disclosure may be employed in communication systems providing relatively high-bandwidth, low-latency network communication via a constellation of satellites, cellular networks, or via ground-based networks. The constellation of satellites may be in a non-geosynchronous Earth orbit (GEO), such as a low Earth orbit (LEO). FIG. 1 illustrates a not-to-scale embodiment of an antenna and satellite communication system 100 in which embodiments of the present disclosure may be implemented. The concepts disclosed herein also apply to non-satellite or ground-based networks. As shown in FIG. 1, an Earth-based endpoint or user terminal 102 is installed on a building 103 at a location directly or indirectly on the Earth's surface such as house or other building, tower, a vehicle (e.g., land-based vehicle, watercraft, aircraft, spacecraft, or the like), or another location where it is desired to obtain communication access via a network of satellites. The endpoint terminal 102 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a geographically stationary or substantially stationary object, such as a platform or a balloon.

A communication path may be established between the endpoint terminal 102 and a satellite 104. In the illustrated embodiment, the satellite 104, in turn, establishes a communication path with a gateway terminal 106. In another embodiment, the satellite 104 may establish a communication path with another satellite prior to communication with the gateway terminal 106. The gateway terminal 106 may be physically connected via fiber optic, Ethernet, or another physical connection to a ground network 108. The ground network 108 may be any type of network, including the Internet. While one satellite 104 is illustrated, communication may be with and between any one or more satellite of a constellation of satellites.

A computing device (not shown in FIG. 1 but illustrated in FIG. 2) may be configured in the home or building 103 and/or the endpoint terminal 102 can be connected via a wired connection 110 (e.g., a fiber optic connection or other type of wired connection) to a ground network 108.

Figure 2:
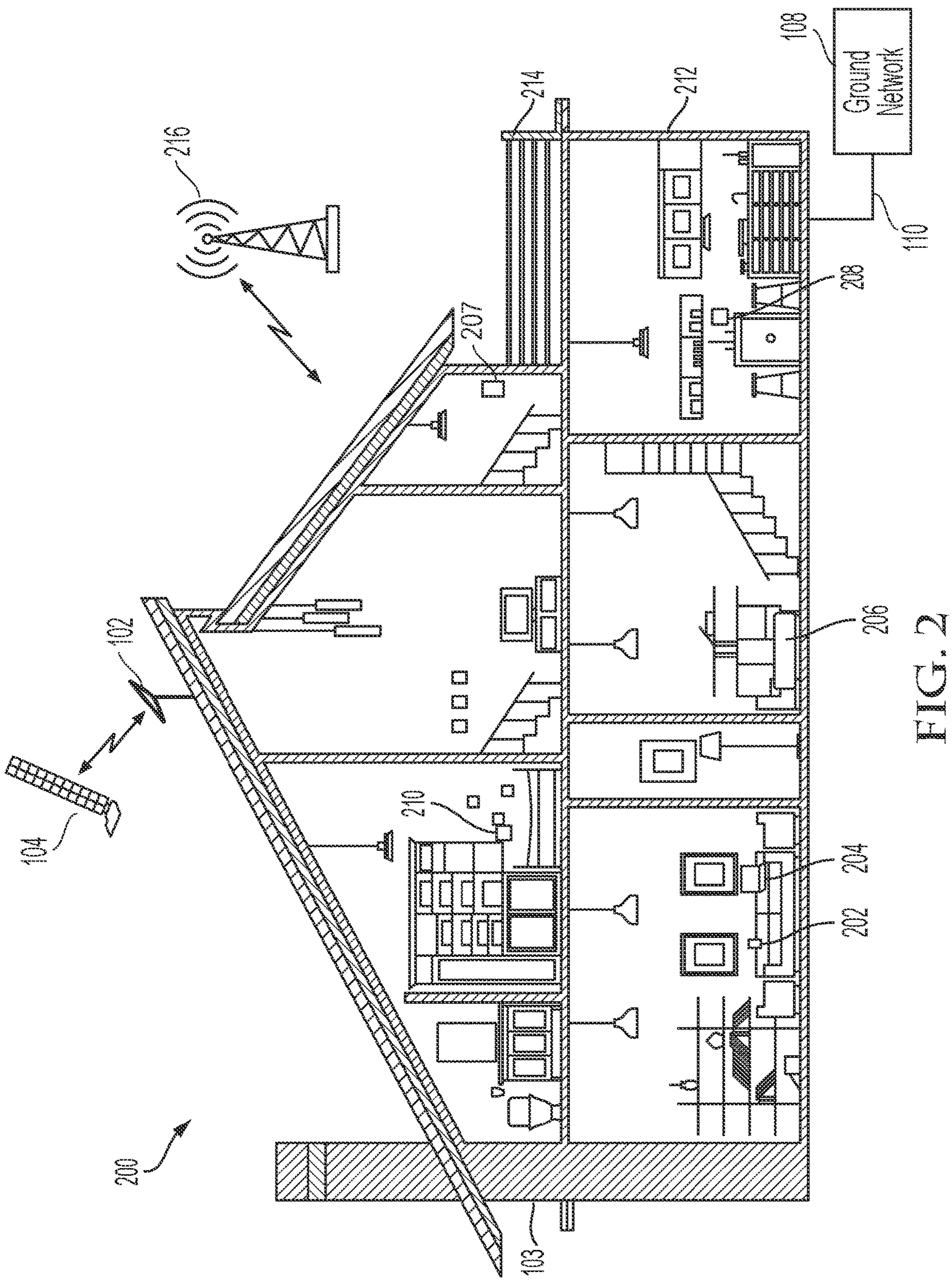
FIG. 2 is a drawing of a two-story structure having a wireless router in accordance with embodiments of the present disclosure.

FIG. 2 illustrates an exemplary local area network (LAN) 200 configured inside a home or building 103. The LAN 200 may include a plurality of electronic or computing devices 202, 204, 206, 207, 208, 210. A wireless router 206 can be one of these computing devices. The wireless router 206 may be connected to a ground network (e.g., the ground network 108 of FIG. 1) via any known means including via a wired connection 110 such as a fiber-optic cable as shown in FIG. 1. The wireless router 206 may also be coupled to the endpoint terminal 102 that enables communication with the satellite 104. A second wireless router 207 is shown in FIG. 2 adjacent to an exterior wall. The different positions of the wireless router 206, 207 may require them to be of different types, which is a concept described more below.

The wireless router 206 may facilitate communications between each of the plurality of computing devices 202, 204, 208, 210, and the ground network 108 through a wired connection 110 or another network which can be configured via the use of the endpoint terminal 102 communicating with one or more satellites 104. The wireless router 206 may communicate with each of the plurality of computing devices 202, 204, 208, 210 using a wireless protocol. For example, the wireless router may communicate with the plurality of computing devices 202, 204, 208, 210 via a Wi-Fi signal (e.g., a signal protocol that is compliant with the Institute of Electrical and Electronics Engineers (IEEE) 802.11 family of technical standards). However, the principles disclosed herein are not based on any particular protocol that might be used.

In another aspect, the wireless router 206 or any of the plurality of computing devices 202, 204, 208, 210 may be connected to a "hotspot" which may be a mobile device (which could be, for example, device 202) or other device that connects via a cellular connection to a base station 216 and that provides access to a network through the cellular network rather than through a wired or satellite network. There are various protocols such as LTE (Long Term Evolution), 4G, 5G and so forth that may be used to manage such cellular communications.

As can be seen in FIG. 2 and is often times the case, most computing devices within a local area network 200 may be located within a relatively even plane. For example, an even plan can be represented by the first floor 212 of FIG. 2 that includes two user devices 202, 204 located on a couch and a user device 208 on a counter, with only one user device 210 on the second floor 214. The term "plane" in one aspect may not refer to a very thin two-dimensional plane as that the term plane often indicates in mathematics. As used herein, the term plane can be a three-dimensional space such as 10 foot high by 1500 square foot space defining a floor of a house or building 103. The term "planar zone" may also be used where the planar zone is a three-dimensional space that, for example, can cover a floor of a building or a portion thereof or some other similar space. Furthermore, many locations include one or more router on each plane (e.g., multiple-story buildings may include one or more wireless router on each floor). In another example, the LAN 200 may include the wireless router 206 on the first floor 212 and a second wireless router 207 on the second floor 214.

Conventional wireless routers are designed with omni-directional antennas in order to communicate with computing devices within their network in any direction. However, conventional routers represent an inefficient use of energy as a relatively even amount of energy is radiated in all directions even when no computing devices are present in a particular direction. Thus, a majority of the generated energy becomes dissipated in the environment and is not used for communication. This inefficient use of energy is wasteful and requires a relatively large amount of power to radiate, and also increases the likelihood of interference with nearby devices using the same spectrum as the wireless router because the wireless router is listening in all directions (e.g., local devices not on the local network, devices from neighboring networks, or the like).

In order to achieve improved performance relative to conventional wireless routers, the wireless router 206 may be designed to include higher gain antennas that radiate energy into an area in which electronic devices are most likely to be located. For example, a router 206 may radiate the energy into an area that generally corresponds to a single floor of a residence or other building such as by generating a circularized fan beam or a skinny donut beam. This beam generation optimizes energy efficiency by sending energy only where the energy is most likely to be used. Because most Wi-Fi devices located in a single floor of a home are along or near a single plane (e.g., device on your desk, in your hand, on a table, in a TV, etc.) or planar zone, the present disclosure optimizes a set of antennas to only send energy or to generally transmit its signal or electromagnetic fields in a particular space associated with the plane, or to radiate a greater amount of energy along or near the single plane zone than in other directions. This single-plane energy transmission and receipt helps avoid interference from other locations as more noise is rejected from directions having significant vertical components. The disclosed antenna pattern allows the wireless router 206 to communicate with users in directions in which a majority of user devices are located, which is necessary for broadcast packets and uplink requests. In some aspects, the wireless router 206 may further utilize beamforming on top of the directional pattern to focus the energy in the individual direction of a user and switch directions on a per user basis. The use of directional focus and beamforming provides the flexibility to support broadcast situations and to focus in on user devices once a user device is located. In some aspects, the wireless router 206 may also be capable of omni-directional communications to allow the wireless router 206 to communicate with electronic devices located on a different plane or in a different planar zone (i.e., a different floor) than the wireless router 206.

Phased Array Antenna System

Figure 3A:
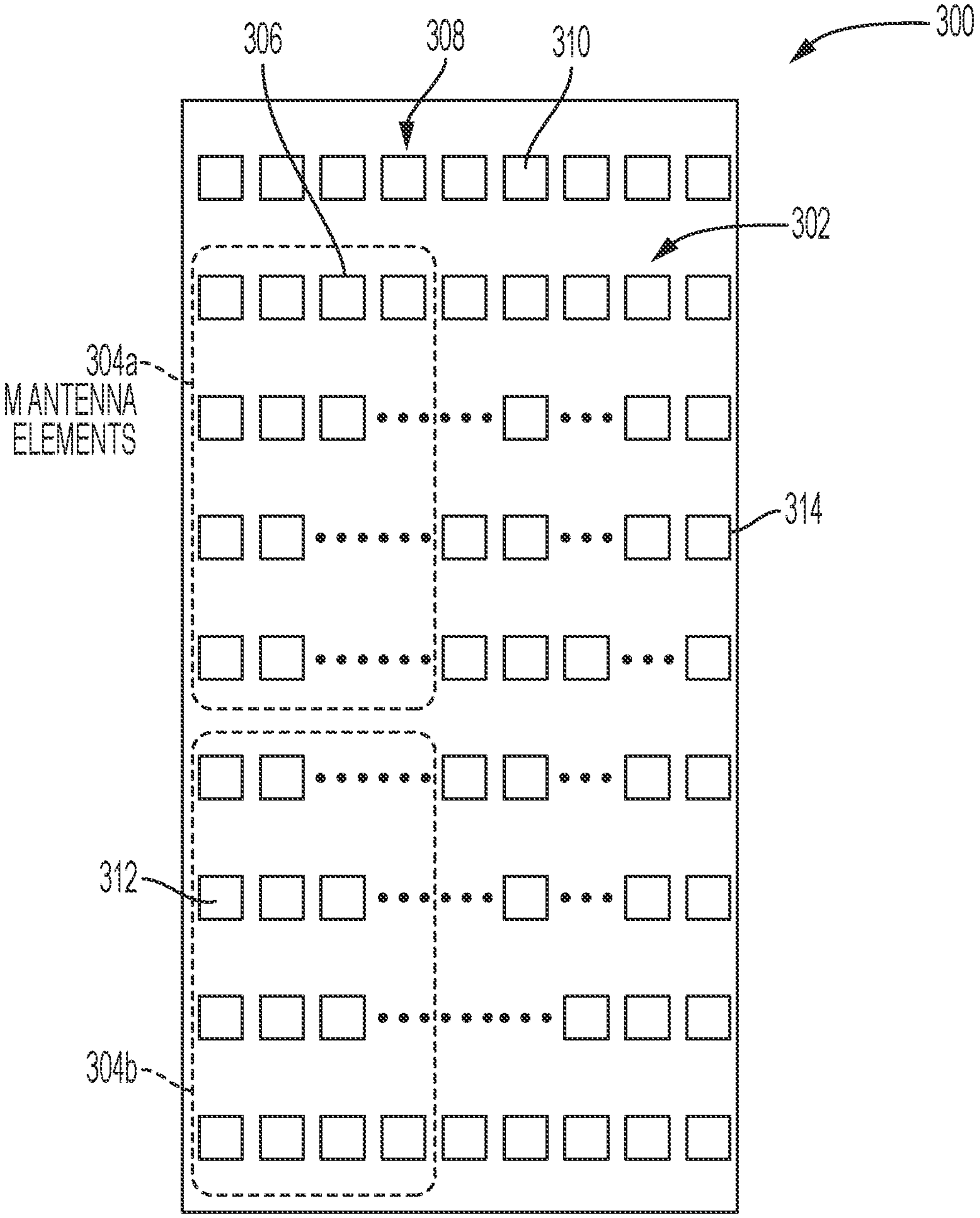
FIG. 3A is an example illustration of a top view of an antenna lattice in accordance with embodiments of the present disclosure.
Figure 3B:
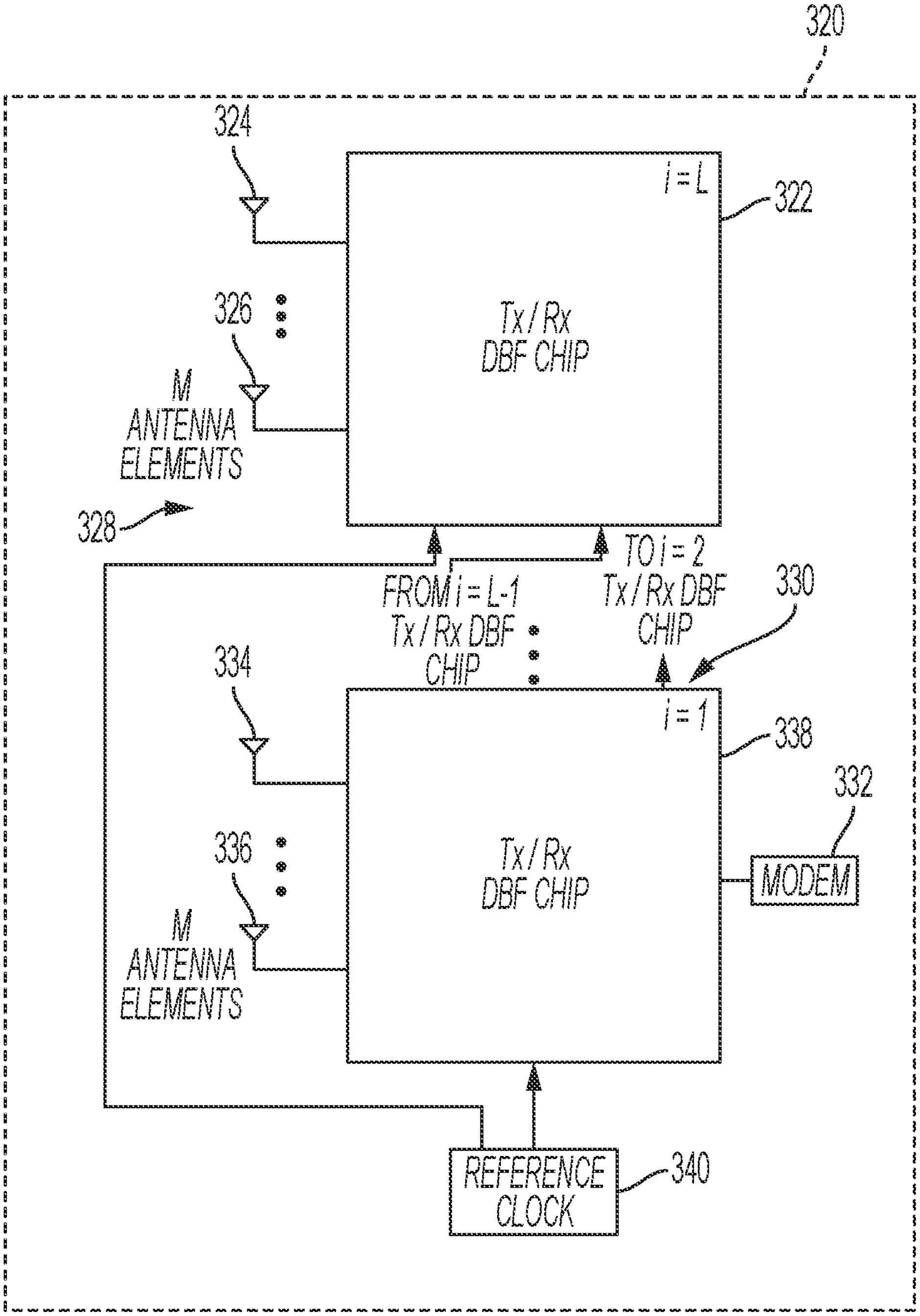
FIG. 3B is an example illustration showing a beamformer lattice associated with an antenna lattice in accordance with embodiments of the present disclosure.
Figure 3C:
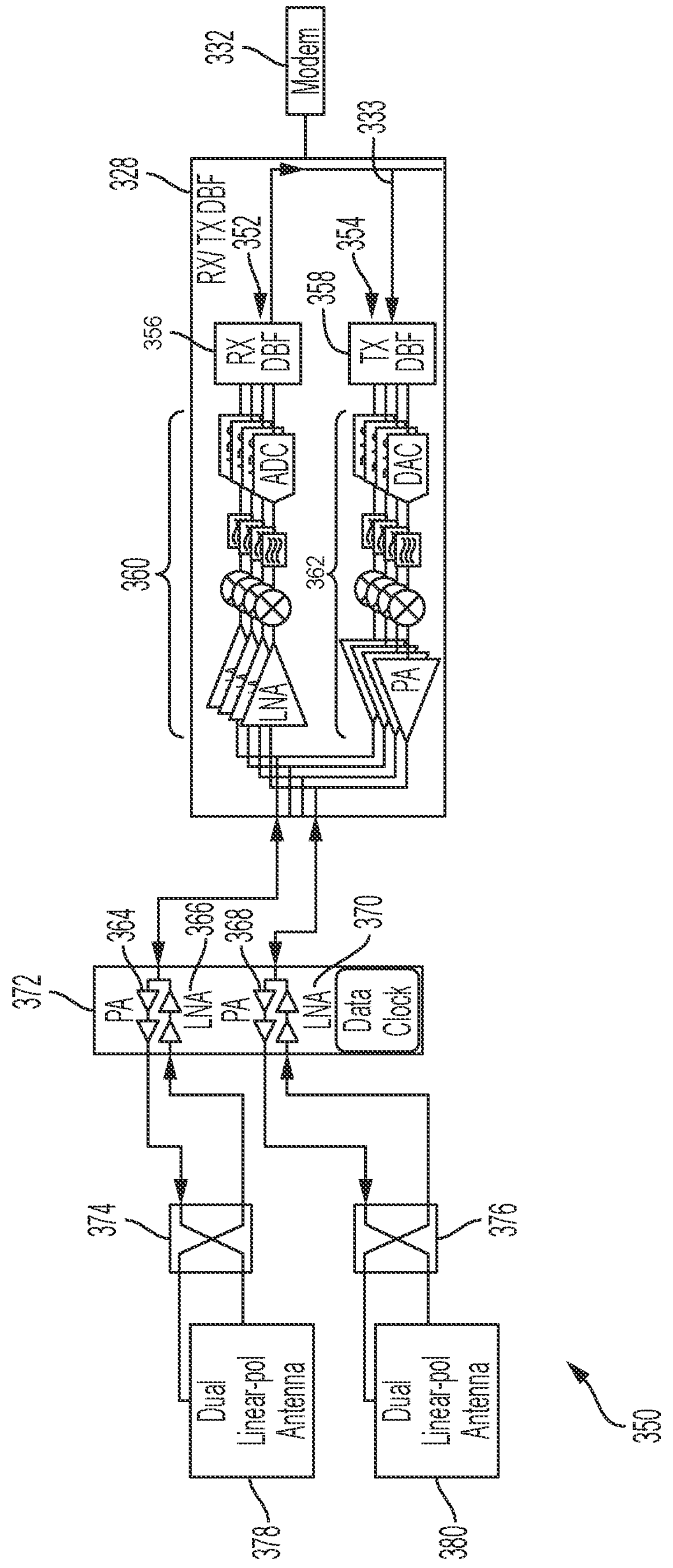
FIG. 3C is an example illustration showing a simplified block diagram of a radio frequency (RF) path for an antenna assembly including antenna elements, transmit/receive (TX/RX) front-end-module (FEM) chip, and digital beam former (DBF) chip connected with bidirectional RF I/O lines in accordance with embodiments of the present disclosure.

The directional antenna pattern and beamforming may both be achieved using a phased array antenna system. FIGS. 3A-3C are schematic illustrations of an electronic system of a phased array antenna system 300 in accordance with embodiments of the present disclosure. The phased array antenna system 300 may be designed to transmit and/or receive a patterned beam (e.g., a beam oriented along a planar zone) or a combined beam composed of signals (also referred to as electromagnetic signals, wavefronts, or the like) in a preferred direction from or to an antenna aperture 302. Accordingly, the plurality of antenna elements simulates a large directional antenna. An advantage of the phased array antenna system 300 is its ability to transmit and/or receive signals in a preferred direction (i.e., the antenna's beamforming ability) without physically repositioning or reorienting the system.

In some aspects, a phased array antenna system 300 may be configured to transmit and/or receive radio frequency (RF) signals, such as a signal complying with the IEEE 802.11 family of standards. During operation, the system 300 might be periodically in receive (RX) mode, transmit (TX) mode, idle mode, or a combination thereof. The antenna system 300 can include a phased array antenna including a plurality of antenna elements 306 defining an antenna aperture 302, for example, antenna elements 306 distributed in one or more rows and/or columns (see FIG. 3C) and a plurality of phase shifters (not shown) configured for generating phase offsets between the antenna elements 306 to form a combined beam. As a non-limiting example, a two-dimensional phased array antenna may be capable of electronically steering a beam in two directions. Referring to FIG. 3A, the antenna aperture 302 of the phased array antenna system 300 is the area through which the power is radiated or received. A phased array antenna synthesizes a specified electric field (phase and amplitude) across an aperture 302.

FIGS. 3A-3C illustrate the phased array antenna system 300 that includes an antenna lattice 328 including a plurality of antenna elements 324, 326, 334, 336 and a beamformer lattice 330 including one or more digital beamformer (DBF) chips 322, 338 (which may be referred to herein as digital beamformers, DBFs, or DBF chips) for receiving signals from a modem 332 and sending signals to the modem 332. The antenna lattice 328 is configured to transmit or receive a combined beam of radio frequency signals having a radiation pattern from or to the antenna aperture 302. The beamformer lattice 330 includes at least one digital beamformer (DBF) 322, 338 including a plurality of phase shifters (not shown).

In the illustrated embodiment, the antenna lattice 328 can include the plurality of antenna elements 324, 326, 334, 336 in sets, groupings, or subsets 304*a*, 304*b*. Each subset 304*a*, 304*b* of the plurality of antenna elements can include M antenna elements 324, 326, 334, 336, which may be associated with specific DBF chips 322, 338. The remaining antenna elements 310 of the plurality of antenna elements may be similarly associated with other DBF chips (not shown) in the plurality of DBF chips 330.

FIG. 3C illustrates circuitry or electrical components included in and/or associated with a single DBF 338 in accordance with some aspects of the present disclosure. The contents of each of the DBF chips 330 may be similar to that discussed herein for DBF 338. In the receiving direction (RX), the beamformer function is to delay the signals arriving from each antenna element such that the signals all arrive to the combining network at the same time. In the transmitting direction (TX), the beamformer function is to delay the signal sent to each antenna element such that all signals arrive at the target location at the same time.

In some aspects, a phased array antenna system 300 includes a beamformer lattice 330 including a plurality of DBF chips 338, a front-end module (FEM) lattice including a plurality of FEM chips 372, and an antenna lattice 350 including a plurality of antenna elements 334, 336 (see also antenna elements 312, 310 in FIG. 3A). In some aspects, 90-degree hybrid couplers 374, 376 may be disposed between each antenna element 306 and each FEM chip 372.

As shown in FIG. 3B, each TX/RX DBF 322, 338 may be capable of processing transmit and receive signals. However, in some aspects, a DBF chip associated with each group of antenna elements 334, 336 may be configured for either transmit or receive.

The DBF chip 338 includes, among other components, a transmit section 354 and a receive section 352. The DBF chip 338 is configured to generate RF signals (based on data provided by modem 332) to be transmitted by antenna elements 334, 336, and to decode RF signals received by antenna elements 334, 336 to provide to the modem 332. DBF chips described herein may also include calibration sections (not shown).

The transmit (TX) section 354 may include a transmit digital beamformer (TX DBF) section 358 and a plurality of TX RF sections 362 including various components. A data signal or stream may be provided by the modem 332 and may include the input 333 to the TX section 354. The TX RF section 362 may be designed to ready the time delay and phase encoded digital signals for transmission. The plurality of the components in the transmit RF section 362 may include M number of transmit RF sections, one for each of the M paths for each antenna element 306. Each transmit RF section 362 may include other components such as a transmit digital front-end (TX DFE), a digital-to-analog converter (DAC), a low pass filter (LPF), a mixer, and a power amplifier (PA). The amplified RF signal outputted by the PA 364, 368 in the FEM chip 372 is the input to an antenna element 378, 380. In turn, the antenna element 378, 380 radiates the amplified RF signal. Each of the M antenna elements 378, 380 is configured to radiate an amplified RF signal generated by a respective transmit RF section 362.

The receive (RX) section 352 may include a plurality of RX RF sections 360 and a single receive digital beamformer (RX DBF) section 356. Each receive RF section 360 includes components such as a low noise amplifier (LNA), a mixer, a low pass filter (LPF), an analog-to-digital converter (ADC), and a receive digital front-end (RX DBF). In the FEM chip 372, LNA 366, 370 may be designed to perform low noise amplification of the analog RF signal received at the respective antenna element 378, 380. A data signal or stream may be provided to the modem 332 and may include the output from the RX section 352.

As a non-limiting example, the 16 RFIO (radio frequency input/output) of the DBF 338 can control 8 FEM chips 372 (with 2 LNA/PA pairs in each) and 16 dual-port antenna elements 378, 380, together which can be called a DBF "block." Those numbers may be variable depending on the FEM and DBF chip size (and the number of RFIO lines).

Implementation of Phased Array in Wireless Routing

Figure 4A:
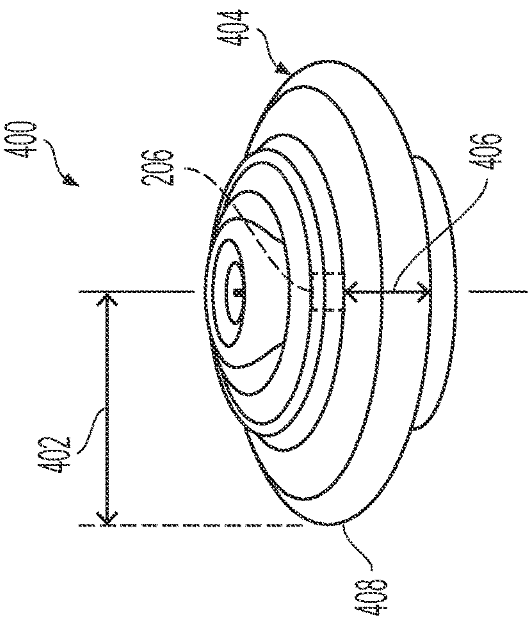
FIG. 4A is an example illustration showing an isometric view of a first embodiment of a beam emanating from a high gain antenna in accordance with embodiments of the present disclosure.

As referenced above, the routing systems of the present disclosure may use phased array antenna systems to present energy in a desired region or area, which may correspond to a floor of a building or other structure. FIG. 4A illustrates an exemplary skinny donut beam 404 and wireless router 206 combination 400. The wireless router 206 is shown in the middle of the skinny donut beam 404. In some aspects, the phased array antenna of the wireless router 206 may be designed to generate a beam similar to the skinny donut beam 404 having a radius 402 and a height 406. The skinny donut beam 404 may have an outer edge 408 with the height 406 measured in a vertical direction that is less than or equal to a height of an average floor of a building (e.g., 8 feet, 10 feet, 12 feet, or the like). Although energy may continue propagating outward from the outer edge 408, the outer edge 408 may be a distance at which the wireless router 206 is designed to communicate. For example, the outer edge 408 may be located a distance 402 from the wireless router 206 that is at least 10-1000 feet or any range in between. Values higher or lower than 10-1000 feet are also contemplated. In one example, the wireless router 206 may be designed for use in an area that is 25 feet by 25 feet. The outer edge 408 of the generated beam 400 may be located 25 feet away from the wireless router 206, and the outer edge 408 may have a height 406 that is 10 feet. The three-dimensional space covered by the skinny donut beam 404 can be characterized as the planar zone.

In some aspects, the outer edge 408 may be designed to have a height 406 that is less than a total height of a floor. As referenced above, most electronic devices within a floor of a building are located approximately on a same general plane (e.g., between 3-5 feet above a floor). The beam 404 may be designed to have a height 406 that varies as little as possible from an area adjacent to the wireless router 206 to the outer edge 408. For example, the height 406 may vary from two feet at a location adjacent to the wireless router 206 to a height 406 that is less than or equal to ten feet (e.g., 2 feet, 3 feet, 5 feet, 7 feet, or the like) at the outer edge 408. The wireless router 206 may therefore focus the beam energy to a particular location depending on the room or floor size and shape as well as potentially the specific location of devices 202, 204, 208, 210 that are to communicate with the wireless router 206.

Figure 4B:
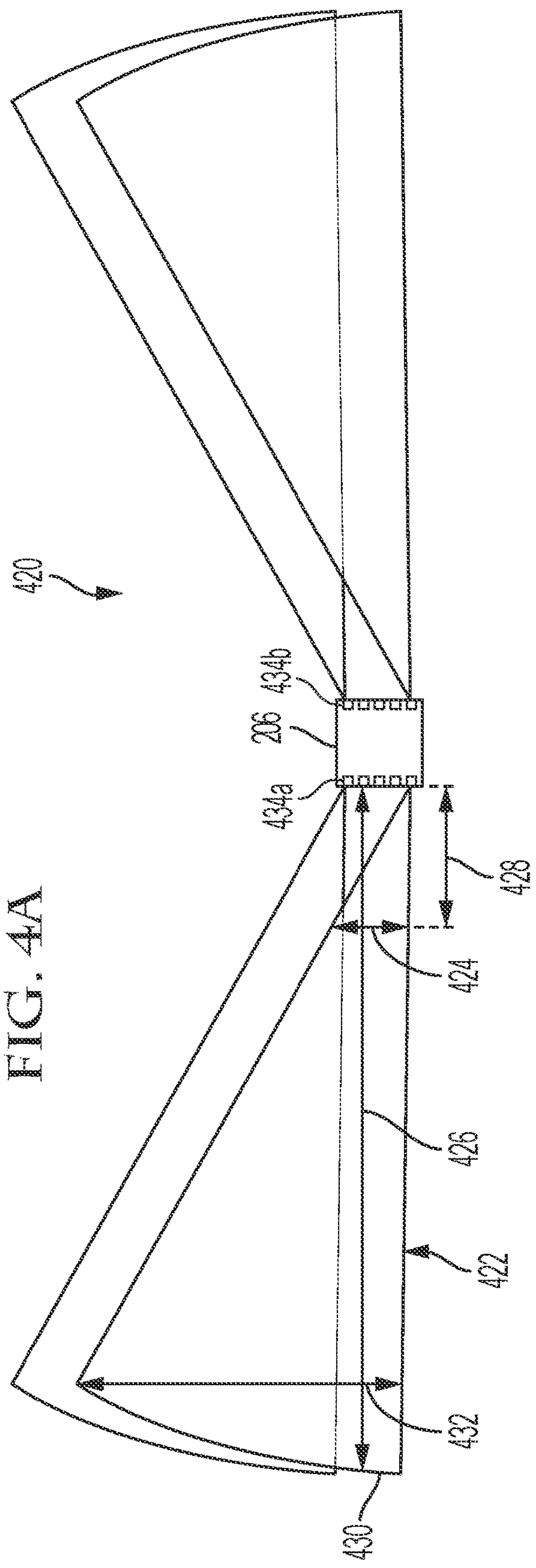
FIG. 4B is an example illustrating showing a cross-sectional view of a second embodiment of a beam emanating from a high gain antenna in accordance with embodiments of the present disclosure.

FIG. 4B illustrates a fan beam transmitted from the wireless router 206 420 as well as an exemplary circularized fan beam 422. In some aspects, the phased array antenna of the wireless router 206 may be designed to generate a beam similar to the circularized fan beam 422. The circularized fan beam 422 may have an outer edge 430 with a height 432 (e.g., in a vertical direction) that is less than or equal to a height of an average floor of a building (e.g., 8 feet, 10 feet, 12 feet, or the like). Although energy may continue propagating outward from the outer edge 430, the outer edge 430 may be a distance 426 at which the wireless router 206 is designed to communicate. For example, the outer edge 430 may be located a distance 426 from the wireless router 206 that is at least 10-1000 feet. The wireless router 206 may be designed for use in an area that is twenty-five feet by twenty-five feet. The outer edge 430 of the generated beam 428 may be located twenty-five feet away from the wireless router 206, and the outer edge 432 may have a height 430 that is ten feet.

In some aspects, the outer edge 430 may be designed to have a height 432 that is less than a total height of a floor. As referenced above, most electronic devices within a floor of a building are located approximately on a same plane (e.g., between three to five feet above a floor). In that regard, the beam 428 may be designed to have a height 432 that varies as little as possible from an area adjacent to the wireless router 206 to the outer edge 430. For example, the height 432 may vary from 2 feet at a location adjacent to the wireless router 206 to a height 432 that is less than or equal to ten feet (e.g., 2 feet, 3 feet, 5 feet, 7 feet, or the like) at the outer edge 430. The area adjacent to the wireless router 206 may be defined be a region having a distance 422 and a height 424 next to the wireless router 206.

The structure of the wireless router 206 can include a configuration of one or more vertical array antennas **434*a*, 434*b*. Two such antennas are shown by way of example. These can be configured with multiple antenna elements as shown in FIG. 3A. As shown, the vertical array antennas 434*a*, 434*b* can be configured in a generally vertical direction such that the signal energy is transmitted as shown in FIG. 4B. There are a number of different ways the disclosed structure can be implemented. FIG. 4B shows a box as the wireless router 206 which can have four vertical sides. One or more of these sides can have a vertical array antenna 434***a*, 434*b*. The structure could also be cylindrical with antenna elements configured facing outward from the cylinder to create the planar zone beam or donut beam 404.

In one example, the angle of one or more of the vertical array antennas 434*a*, 434*b* may also be adjustable mechanically. The system might be able to adjust the angle depending on whether the wireless router 206 is configured at a floor level as is shown in FIG. 2 or on a table or shelf or near a ceiling. Adjusting the angle of the array antenna 434*a*, 434*b* can be implemented for antenna arrays that produce a fixed beam shape 404. In another example, different arrays such as antenna arrays 304*a*, 304*b* in FIG. 3A might be angled differently in a mechanical manner such that the entire antenna array 300 has different angles for subsets or subarrays of antennas.

The different antenna arrays 304*a*, 304*b* may be configurable as well for the wireless router 206. For example, the wireless router 206 might not be positioned right in the center of a floor of a building as is shown in FIG. 2. The donut shaped beam of FIG. 4A is ideal when the wireless router is configured in the middle of the room but the wireless router 206 may waste energy if it is positioned next to an exterior wall. See wireless router 207 of FIG. 2. In such a case, half of the beam energy would be transmitted through the wall and outside. Thus, different groups or subarrays of antenna elements 304*a*, 304*b* can be turned on or off, and/or may be adjusted physically to adapt to the area of desirable signal coverage. These settings may be input by a user or may be automatic as the wireless router 206 can sense or detect its surroundings. A controller or processor on the wireless router 206 can control a sensor and utilizing data from the sensor could made such adjustments.

In yet another aspect, the wireless router 206 might be pre-configured for a particular position. Users might be able to buy a first type of wireless router 206 to be positioned in a central location on a floor with a desire to provide a planar zone beam that covers that floor. A user might also be able to purchase a second type of wireless router 206 that is configured to be placed adjacent to an exterior wall with a desired planar zone beam only transmitted from one side of the wireless router 206 to cover the floor but not waste energy transmitted out of the building. Other types of antenna arrays 434*a*, 434*b* or wireless routers 206 as well might be deployed such as the configuration disclosed herein where there are one or more vertical array antennas plus an omni-directional antenna with the proper control systems in place to adjust or dynamically change configurations of the wireless router 206 depending on the current need for servicing client devices.

The beam 404 of FIG. 4A and the beam 422 of FIG. 4B may each be referred to as a planar beam. In that regard, any beam that fits the parameters described above may be referred to as a planar beam. For example, a planar beam may include any beam having a height that is less than or equal to twelve feet at an outer edge (e.g., an outer distance at which the router is designed to communicate). Although the shape of the beam itself may not be technically planar, the beam is designed to communicate with components on a planar zone (e.g., a three-dimensional region four feet above a floor and that extends across a room or a floor in a building). The planar zone coverage by the planar beam will likely cover most, if not all, electronic components located on a single floor in a building. The beam may be characterized as a planar zone beam as well to capture the idea of the three-dimensional space that is covered by the beam.

Figure 5A:
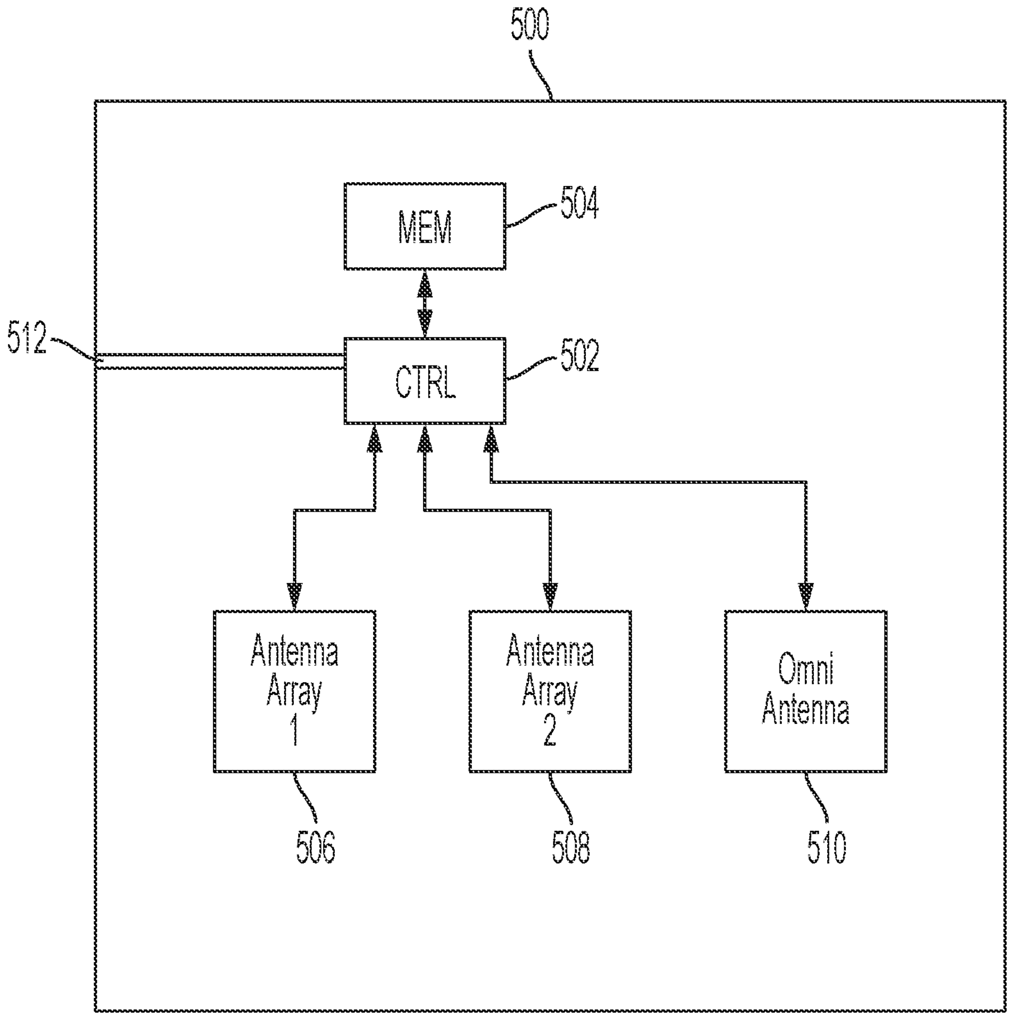
FIG. 5A is an example illustration showing a simplified block diagram of a wireless router having beamforming functionality in accordance with embodiments of the present disclosure.

FIG. 5A illustrates a block diagram of an exemplary wireless router 500. The wireless router 500 may be used as the wireless router 206 of FIG. 2. In particular, the wireless router 500 may include a controller 502, a non-transitory memory 504, a first antenna array 506, a second antenna array 508, and an omni-directional antenna 510.

The controller 502 may include any one or more logic device that together are capable of implementing logic or program instructions. For example, the controller 502 may include a collection of logic gates, a microcontroller, a processor, a field-programmable gate array (FPGA), an application-specific integrated circuit (ASIC), or the like. In some aspects, the controller 502 may include a memory (which may or may not be included in place of the memory 504). The memory may store instructions usable by the controller 502 to perform functions. A communication channel or bus 512 can be used to communicate with other components or to receive power at the wireless router 500.

The non-transitory memory 504 may include any non-transitory memory such as random-access memory (RAM), read-only memory (ROM), a digital memory, an analog memory, or any other type of memory. The memory 504 may include instructions usable by the controller 502 to perform logic functions. In addition, the controller 502 may cause the memory 504 to store information as requested by the controller 502 (e.g., the controller 502 may cause the memory to store identifiers and location data corresponding to electronic devices with which the router 500 is communicating).

The first antenna array 506 may be designed to generate a first beam. The beam may be adjustable by the controller 502 (and/or by beamformers or other phase shifters incorporated into the antenna array 506). In some aspects, the first beam may correspond to a planar beam and thus be designed to communicate with any electronic devices located substantially on a same floor of a building as the wireless router 500. That is, the first antenna array 506 may generate a beam that resembles the beam 404 of FIG. 4A or the beam 428 of FIG. 4B. The controller 502 (or beamformer within the first antenna array 506) may cause the first antenna array 506 to generate a first planar zone beam by adjusting a phase of each of the directional antennas within the first antenna array. The first planar zone beam may result in a gain of at least thirteen decibels relative to isotrope (dBi). In another example, the planar zone beam may have a gain of twenty decibels relative to isotrope (dBi).

In some aspects, the wireless router 500 may communicate with an identified electronic device (e.g., any of the electronic devices 202, 204, 208 210 shown in FIG. 2). During establishment of the connection between the router 500 and the electronic device, a location of the electronic device relative to the router 500 may be determined by the router 205. For example, the controller 502 (or a beamformer within the first antenna array 306*a*) may determine the location of the electronic device 202, 204, 208 210 based on the received signals from the electronic device. In order to further optimize performance of the communications, the wireless router 206 may be designed to generate a more focused beam (e.g., a pencil beam) directed towards the electronic device. The focused beam may have a reduced beamwidth relative to the planar beam, and may be focused towards the electronic device 202, 204, 208 210. In some aspects, the controller 502 may control the first antenna array 506 to generate the focused beam towards the electronic device. In some aspects, the controller 502 may control the second antenna array 508 to generate the focused beam towards the electronic device. In some aspects, the controller 502 may cause the first antenna array 506 to continue generating the planar beam while causing the second antenna array 508 to generate the focused beam towards the electronic device 202, 204, 208 210. In some aspects, the controller 502 may only cause one of the antenna arrays 506, 508 to operate at any given time. The focused beam may result in a gain of at least twenty dBi.

In some aspects, the controller 502 may identify more than one electronic device 202, 204, 208 210 with which the wireless router 500 is to communicate. The controller 502 may cause the first antenna array 506 or the second antenna array 508 to generate a first focused beam towards the first electronic device 202, a second focused beam towards the second electronic device 204, and so forth. In some aspects, the controller 502 may control the respective antenna array 506, 508 to generate both focused beams simultaneously. In some aspects, the controller 502 may control the respective antenna array 506, 508 to generate the first beam for a first period of time, then generate the second beam for a second period of time, and continue rotating between all active electronic devices 202, 204 with which the router 500 is communicating.

In some aspects, an electronic device 202, 204, 208 210 may be located outside of the region covered by the planar beam (e.g., the electronic device may be located on a different floor of the building than the router 500). The omni-directional antenna 510 (which may include one or more antenna element(s)) may be designed to transmit and receive signals using a beam that is broader than the planar beam. For example, the omni-directional antenna 510 may transmit and receive signals to/from any direction relative to the router 500. Although the gain achieved using the omni-directional antenna 510 will not be as great as the planar beam or the focused beam, the use of the omni-directional antenna 510 can allow the router 500 to communicate with electronic devices located any direction relative to the router 500. For example, the router 500 may learn that a user device is located outside of the planar beam generated by the first antenna array 506. Based on such information, the controller 502 may control or cause the omni-directional antenna to communicate with the user device outside of the planar beam generated by the first antenna array 506. In some aspects, after learning the location of the user device that is outside of the planar beam, the controller 502 may cause the omni-directional antenna to continue communicating with the user device. In some aspects, after learning the location of the user device that is outside of the planar beam, the controller 502 may control at least one of the first antenna array 506 and the second antenna array 508 to generate a focused beam towards the location of the user device, as described above.

In some aspects, the controller 502 may control the first antenna array 506 to generate a broader beam than the planar beam in order to communicate with a user device outside of the planar beam. After learning that the user device is outside of the area covered by the planar beam, the controller 502 may control the first antenna array 506 to generate the broader beam, which may or may not be omni-directional.

In some aspects, a router 500 may include only a first antenna array 506 designed to generate a planar beam. In some aspects, the router 500 may also include an omni-directional antenna 510. In some aspects, the router 500 may also include another antenna array 508 designed to generate a focused beam. Other variations on the number of antenna arrays and the number of omni-directional antennas can vary. One or more of each of these types of antennas can be configured in an example router 500.

Figure 5B:
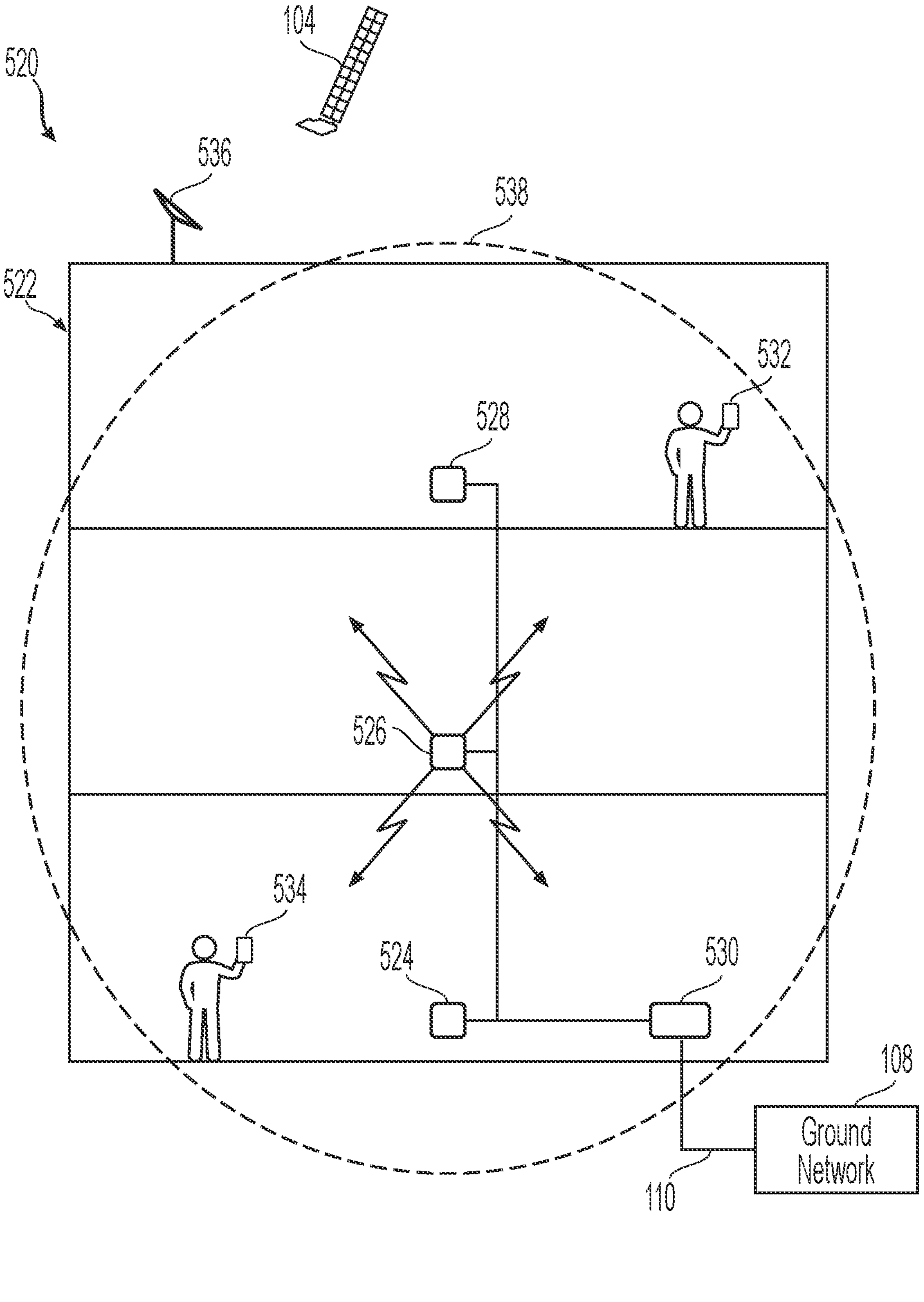
FIGS. 5B and 5C illustrate a networked set of wireless routers that vary their beamforms based on various parameters.

FIG. 5B illustrates a network of routers 520 in a three-story building 522. A first router 524 can be configured on a first floor, a second router 526 is configured on a second floor and a third router 528 is configured on a third floor. The routers 524, 526, 528 can have the configuration shown in FIG. 5A of router 500 with various antenna arrays 506, 508 and an omni-directional antenna 510. Again, each of these routers can have one or more antenna arrays and one or more omni-directional antennas. The routers 524, 526, 528 in one example are networked together such that a controller or central control system 530 can be used to dynamically vary the beam forms and selection of antennas used for transmission by each respective router 524, 526, 528.

The central control system 530 may establish communication with a first type of wireless router 524 configured in the center of the first floor of a building 522, a second type of wireless router 526 configured next to an exterior wall on the second floor of the building 522, and a third wireless router 528 configured on the third floor of the building 522. The central control system 530 can understand the capabilities of the different routers and manage parameters for each respective wireless router as low gain modes, high gain modes, broadcast signals, use of antenna arrays versus omni-directional antennas, beamforming in a high-gain mode or a low-gain mode, digital beamforming and/or mechanical beam steering, and so forth. The algorithm or program used by the central control system 530 can take into account the different capabilities and/or locations of the various wireless routers 524, 526, 528 and manage the overall coverage in a building 522 or other area accordingly. Different routers might receive control signals to change into various different configurations to enable an overall RF signal coverage for a building (single story or multi-story) 522 or other space.

There may be a number of different scenarios and parameters by which the beamforms from respective routers 524, 526, 528 can be adjusted to improve the service to the users in the building. For example, the user on the third floor has a device 532 and the user on the first floor has another device 534. Each device 532, 534 will connect to a Wi-Fi network. The building 522 may be a business and the time can be nighttime where only a few people are in the building and require network access. In this scenario, the system may cause the router 526 to implement an omni-directional antenna 510 and produce the beamform 538 which covers all three floors. The data load on the network can be small enough that only one router 526 is needed to provide high quality service. Thus, the time of day and predicted usage of the network on a building basis, office basis, set of floors basis, and so forth, can be one factor which causes a switch in both which routers 524, 526, 528 are active and what the beamform is for the active router(s) 524, 526, 528.

An endpoint terminal 536 (e.g., similar to endpoint terminal 102 in FIG. 1) can be used in connection with the controller 530 to provide network access through the satellite 104. Also shown is a wired connection 110 to the ground network 108. In some cases, the bandwidth available to users via a satellite connection can be greater than the bandwidth available through the ground connection 110 to the ground network 108. In other scenarios, one service provider may be down and not capable of providing access to the Internet 108. The central control system 530 can also take into account the bandwidth and other conditions available through different service providers to manage the different configurations for each respective router 524, 526, 528.

Figure 5C:
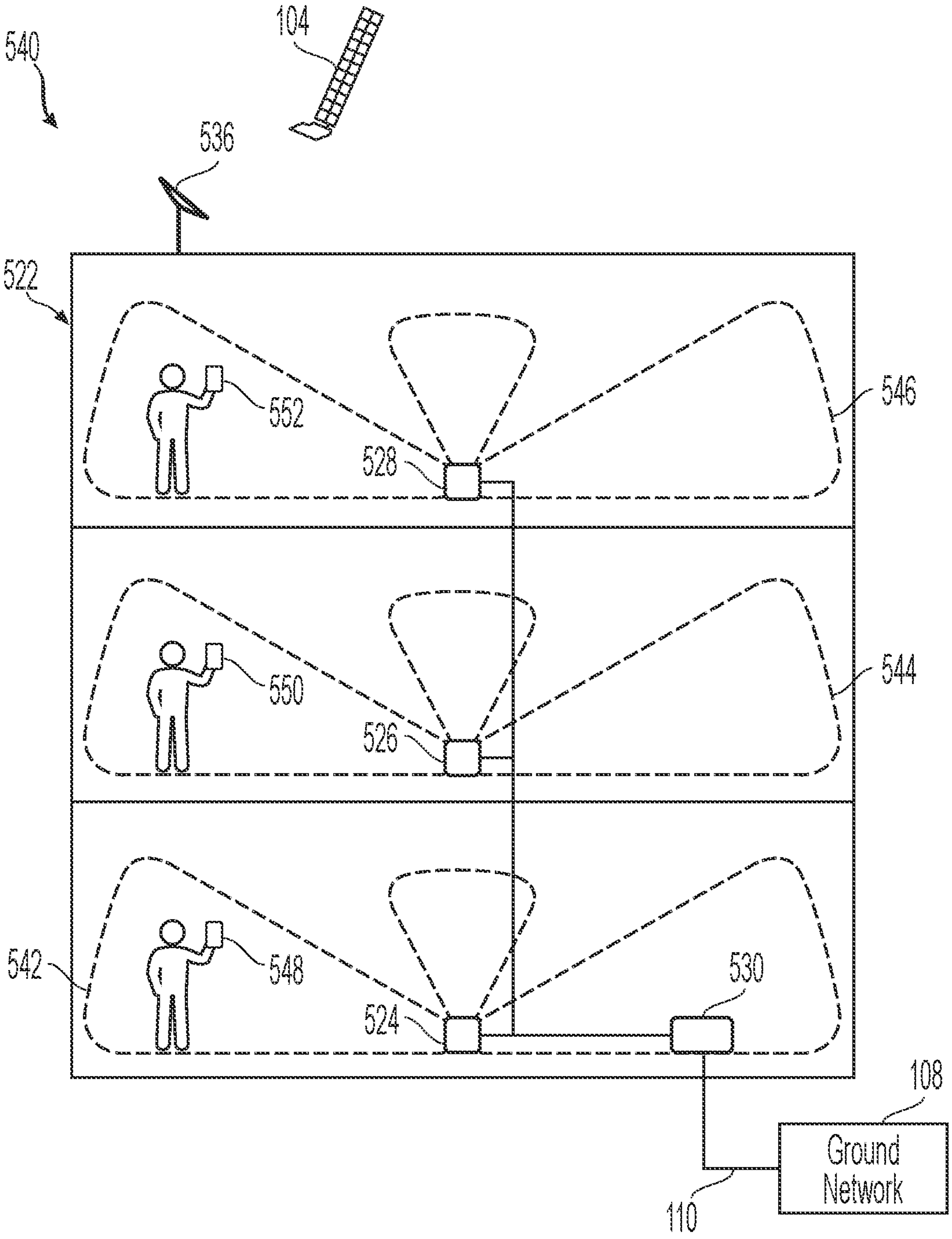

FIG. 5C illustrates a multi-floor radiation pattern in which each of the routers 524, 526, 528 is a planar zone beamform 542, 544, 546 which can enable communications for the respective devices 548, 550, 552 on the respective floors of the building 522. Another data point that can cause an adjustment to the selection of active routers and chosen beamforms is bandwidth availability across one or more networks. For example, if a high bandwidth connection via the endpoint terminal 536 is available, the system may switch to the configuration shown in FIG. 5C which can provide each of the various users with more bandwidth in their network connection to the ground network 108. However, if the satellite network is unavailable through the endpoint terminal 536 and a lower-bandwidth network connection 110 is available to the ground network 108, then the system may adjust to the omni-directional beamform 538 through a single router 526 as in FIG. 5B. The controller 530 can maintain data regarding the bandwidth availability across the network associated with the building 522. The bandwidth availability can vary from time to time based on a time of day, network load, connectivity issues, and so forth. Thus, the adjustments to the beam forms and/or choice of one or more wireless routers 524, 526, 528 can be made dynamically as data is received that can cause the controller 530 to make adjustments. The data can include bandwidth availability as noted above, as well as other factors such as cost of energy, load in the building (i.e., the number of devices 532, 534 accessing the network or volume of data requested), location of a respective load in the building 522 (i.e., which floor or floors requires the most data), and so forth.

The router 500 of FIG. 5A may be designed to support switching between each of the antennas 506, 508, 510. The disclosed switching allows the router 500 to switch between a single floor optimizing radiation pattern (e.g., the planar beam or planar zone beam) as shown in FIG. 5C or a multi-floor radiation pattern as shown in FIG. 5B. The router 500 has flexibility to assign some antennas and radios (e.g., the first antenna array 506) to support users located on one floor, and then switch antenna patterns on other antennas and radios (e.g., the omni-directional antenna 510) to support users on different floors. The antenna switching may be accomplished by either switching between antennas with fixed patterns (e.g., a circularized fan beam and an omni-directional beam), by detuning an antenna to change its antenna pattern, or by turning on and off elements in an antenna array to detune the pattern and move between low gain and high gain transmissions.

In one example, the controller 502 of an individual router 500 or the central control system 530 may utilize artificial intelligence, pattern recognition, machine learning or other programming or models to periodically adjust the beam pattern for one or more routers. For example, at night, in an office building 522, an omni-directional beam pattern as shown in FIG. might be capable of covering expected use on three floors of the building 522 from a single router 526. However, at 8 AM, when office workers start arriving, the system may switch to using multiple routers 524, 526, 528 with one on each floor and each respective router can provide a planar zone beam that covers the numerous devices accessing the network as shown in FIG. 5C. Patterns of usage on a per-floor basis can be determined and used to train a machine learning model or an artificial intelligence model to then make classification decisions regarding the usage of a respective router 524, 526, 528 and based on a classification decision, the system or central controller 530 can adjust the beam forming patterns from one or more routers 524, 526, 528 to improve the efficiency of the overall system while maintaining sufficient services for users accessing the ground network 108.

Machine learning algorithms can also be trained with other data points such as network type (e.g., satellite versus ground communication), bandwidth available to the building 522 or to individual modems or routers, outside data such as expected surges in the need for data through sporting events, holidays or other events which can impact customer access to the ground network 108, and so forth. The controller 530 may implement predictive adjustments in which prior to a high data access event, the beams formed by the various routers 524, 526, 528 can be adjusted in preparation for the increased data use. The controller 530 can utilize received data and process received data by the machine learning algorithm to yield an output or a classification. The output can cause the controller 530, based on the output of the machine learning model, to generate a control signal to send to one or more wireless routers 524, 526, 528 to change a configuration of respective routers. A control signal can also be sent to one or more modems 332 that can also cause data streams from individual client devices to be routed to one or more different communication paths to the ground-based network 108. Other networks can also receive traffic even if they are not ground-based.

Thus, communication paths, beamforming, antenna selection (array, omni-directional), fixed antenna array selection, gain mode selection, which antenna elements to turn on or off, wireless router positions on a floor, and other configurations can be adjustable, via the controller 530, in one or more of a wireless router 524, 526, 528 and/or a modem 332 to achieve improved signal coverage and more efficient coverage in an area like a multi-story building.

One benefit of the approach disclosed in FIGS. 5A-5C is that when the arrangement of FIG. 5C is used, the devices 548, 550, 552 may not see as many Wi-Fi networks in their listing of potential networks to access. Users in a building or other crowded environment often see many different Wi-Fi networks network options user interface of their device. Many of these neighboring Wi-Fi networks are secure or locked networks that they cannot access. Presenting so many unusable Wi-Fi networks to a user can be confusing to an individual user. Thus, in one example shown in FIG. 5C, a beam 544 radiated from router 526 on the second floor of the building 522 will be detectable and thus show up on a Wi-Fi network list on the user device 550, but would not show up on a Wi-Fi network list for user device 548 on the first floor of the building 522.

As noted above, the position of respective wireless routers may vary in buildings. For example, wireless router 524 of FIG. 5C might be next to the wall on the right (instead of in the middle of the floor as shown in FIG. 5C) and wireless router 528 might be next to the left well. In this case, the adjustable antenna arrays, whether fixed or dynamic, can be configured to project the beam energy in one direction (such as half a donut) into the respect floors. These wireless routers might not need an omni-directional antenna given their positions in the building. The wireless router 526 might include a configuration or be of a type of router than enables the donut shaped beam plus the ability to use beamforming within that pattern, and have an omni-directional capability to expand to the upper and lower floors. The central control system 530 can manage the different settings and configurations as a group of wireless routers to efficiently manage the signal coverage for the building 522. These configurations are just examples and any variety of configurations can be provided.

In another example, the adjustment of beams and which routers are used to cover which area or floor(s) can also be used in connection with adjustments to the Wi-Fi 802.11 wireless protocol. While there are various types of Wi-Fi network, in one aspect, the various access modes such as a distributed coordination function (DCF), a point coordination function (PCF) or a hybrid coordination function (HCF) can be adjusted based on the different beams formed or based on a particular configuration. For example, typically win Wi-Fi networks, a user device 542 will seize the full Wi-Fi channel with the router 524 and transmit and/or receive data between the ground network 108 or the satellite 104. As more devices connect to a Wi-Fi router 524, the bandwidth and quality of service can be reduced for each device as more devices compete for the channel. In later versions of Wi-Fi such as 802.11ax, multiple devices can communicate in parallel with a respective router 524, 526, 528. IEEE 802.11ax utilizes orthogonal frequency division multiple access (OFDM) or multiplexing in the frequency domain to increase the throughput for multiple devices connecting to a single router. But there still can be issues when many devices connect with an individual router.

An individual router control system or a central control system 530 that manages multiple routers can make adjustments given the capabilities of the 802.11 protocol used. For example, if one wireless router 526 has so many devices communicating with it that the bandwidth or quality of service is reduced for the individual client devices, the central control system 530 might adjust the protocol or change the mode of one or more wireless routers 524, 526, 528 to cause, as an example, the wireless router 528 on the third floor to switch to an omni-directional mode and cause a signal to reach into the second floor to service one or more client devices 550 on that floor and reduce the load on the wireless router 526. The central control system 530 can also utilize information such as the known location of a client device 550 on the second floor being serviced by the wireless router 526. The central control system 530 can know where to form a beam through a beamforming component on the wireless router 528 to reach up to the second floor and provide service to that client device 550. In other words, the central control system 530 can use its knowledge of the location of one wireless router 526 and the relative position of a client device 550 to that wireless router 526 to determine the relative position of the client device 550 to a different wireless router 528 which may or may not be on the same floor. The information can be used to radiate a signal using beamforming to the client device 550 from a chosen router to provide good network access service.

In another aspect, a service level agreement (SLA) for one or more user devices 548, 550, 552 may also drive or cause adjustments to the beamforming structure in a building 522. For example, user device 550 may have an SLA requiring or guaranteeing a certain bandwidth while in the building 522 for that user. The central control system 530 can know and track the SLAs for one or more user devices 548, 550, 552 and can make beamforming, router adjustment and network (i.e., between a satellite 104 network and a ground network 108) adjustments based on providing the quality of service to individual user devices 548, 550, 552 according to individual SLA requirements.

In another aspect, a method can include seeking to optimize the beam patters and use of the energy transmitted from one or more routers for a specific environment. For example, with reference to FIG. 5C, a base antenna pattern for different operational modes or for different routers 524, 526, 528 can be established. The base antenna pattern, for example, can be an omni-directional pattern 538 as shown in FIG. 5B, but it does not have to be any specific type of pattern. In one aspect, router 524 may need to send and receive data from the first floor as well as the second floor. A base antenna pattern can be determined by the system 108 or one by or more routers 524, 526, 528. The central control system 530 can then perform beamforming on top of that base antenna pattern. The base antenna pattern can relate to a three-dimensional area where wireless communication coverage is desired. One or more beams can be generated to match the base antenna pattern. Starting with an omni-directional pattern 538 as shown in FIG. can be inefficient as energy is being transmitted to places where the system does not need coverage. Thus, the system can beamform on top of the base antenna pattern to optimize the use of the radiated signal energy even more.

Reduced Power Design

Digital beamforming, while providing increased gain and reduced interference relative to conventional wireless communication systems, comes with certain drawbacks. For example, digital beamforming processors can be relatively expensive. Furthermore, digital beamforming systems utilize a relatively large amount of electrical power relative to conventional communication systems. The increased power consumption, especially for a wireless router which is always on, may undesirably increase power costs of a property owner or tenant.

Figure 6:
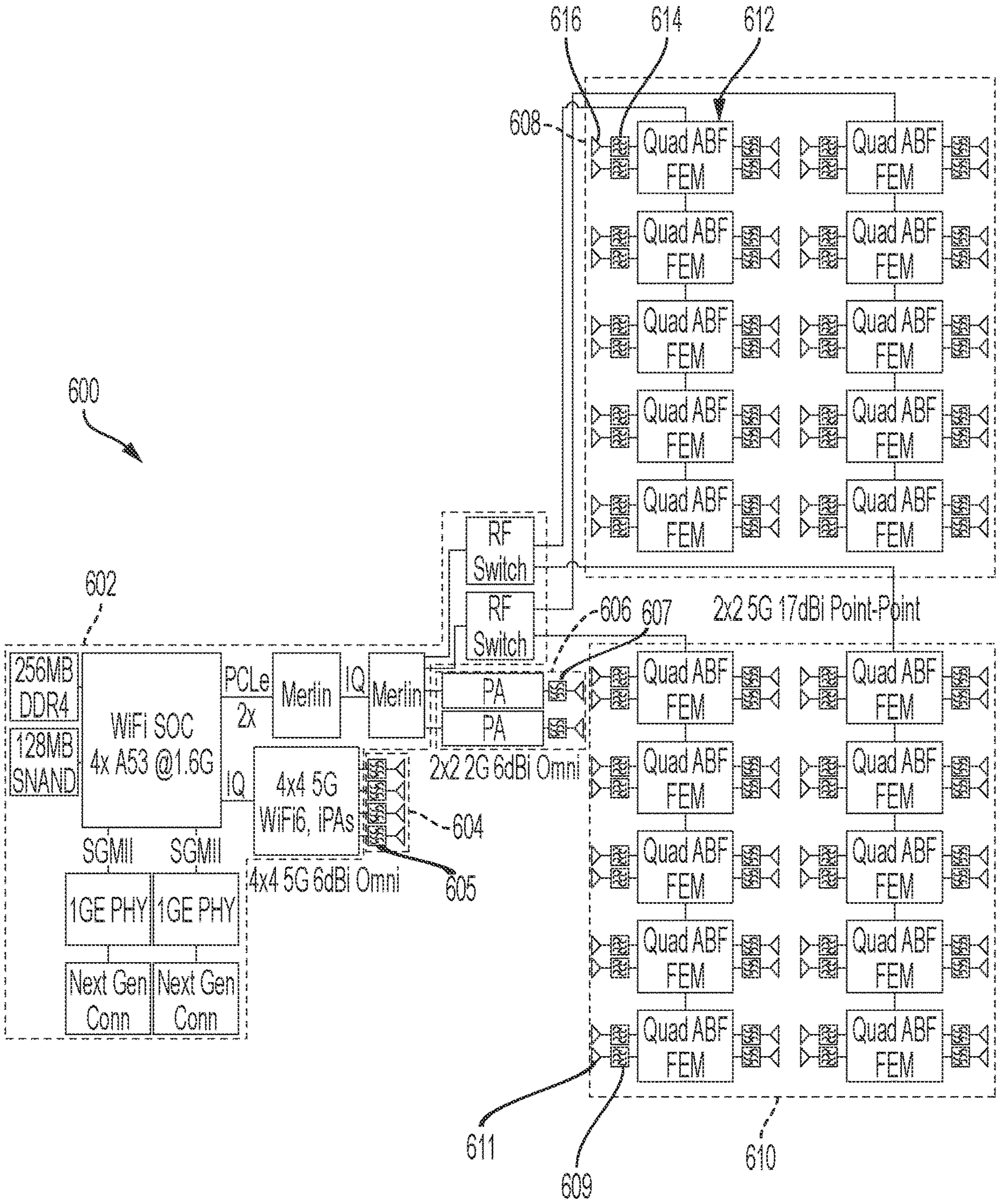
FIG. 6 is an example illustration showing a simplified block diagram of a wireless router having beamforming functionality in accordance with embodiments of the present disclosure.

FIG. 6 illustrates an exemplary router 600 that includes a hybrid of analog and digital beamforming to reduce system cost and to reduce power consumption relative to digital beamforming systems. In particular, the router 600 may integrate at least one analog phase shifter into front-end modules (FEMs) and configure analog phase shifters inline with antenna paths to create a larger array of antennas without increasing a size of a base router chipset and base chipset signal chain support. In general, a FEM can include or integrate multiple components to implement a radio frequency front-end. Components can include power amplifiers, input/output impedance matching components, one or more switches, and one or more low-noise amplifiers. The disclosed antenna array with analog phase shifters may then be connected to a Wi-Fi chipset and controlled by a wireless media access control (MAC) so beamforming may be switched on a per-user basis. The disclosed approach allows the router 600 to efficiently utilize the wireless spectrum and reduce transmitting power so energy is only sent to an electronic device with which the router 600 is communicating. In addition, a broader beam (or omni-directional beam) may be generated in order to transmit broadcast packets to any electronic devices within range of the router 600 and to receive communication requests from such electronic devices.

In particular, the router 600 may include a controller 602. The controller 602 may include any one or more logic devices such as logic gates, microprocessors, application specific integrated circuits (ASICs), field programmable gate arrays (FPGAs), or the like. In some aspects, the controller 602 may also include one or more digital beamformer. The digital beamformer may adjust a phase of a signal to be transmitted by (and a signal received by) each antenna of a particular antenna array to generate a beam. The controller 602 may also include logic that transmits and receives data to/from an input port (e.g., an ethernet port, a fiber-optic cable port, or the like), which may be coupled to a device that communicates with a remote network (e.g., a satellite receiver, cable modem, or the like). The controller 602 may also include logic functions to wirelessly communicate with electronic devices, as discussed above with reference to FIG. 5A.

The router 600 may further include a plurality of antenna arrays including a first antenna array 604, a second antenna array 606, a third antenna array 608, and a fourth antenna array 610. The first antenna array 604 may be designed to generate an omni-directional beam, or a beam that is broader than a planar zone beam as described above. The first antenna array 604 may communicate at a first frequency (e.g., 5 Gigahertz (GHz)). The first antenna array 604 may include a single antenna, or may include multiple antennas inline with analog phase shifters 605 to generate a desired beam shape. If multiple antennas and phase shifters are present, the controller 602 may control the phase shifters and antennas to generate a beam having a desired shape, size, and direction. In some aspects, the antennas and phase shifters are designed to always generate a constant beam.

The second antenna array 606 may also be configured to generate an omni-directional beam, or a beam that is broader than a planar beam. The second antenna array 606 may communicate at a second frequency (e.g., 2.4 GHz). The second antenna array 606 may include a single antenna or may include multiple antennas inline with phase shifters 607 to generate a desired beam shape. If multiple antennas and phase shifters are present, the controller 602 may control the phase shifters and antennas to generate a beam having a desired shape and size. In some aspects, the antennas and phase shifters are designed to always generate a constant beam.

Because the first antenna array 604 and the second antenna array 606 may generate an omni-directional beam (or a relatively planar beam), they may achieve relatively little gain relative to conventional antenna systems. For example, the antenna arrays 604, 606 may achieve approximately 6 dBi of gain. The tradeoff for the reduced gain is that the beam is large enough to communicate with any electronic devices that are within range of the router 600 regardless of the location of the electronic devices relative to the router 600.

The third antenna array 608 may be designed to generate a shaped or focused beam. For example, the third antenna array 608 may generate a planar zone beam as described above. Inline analog beam forming phase shifters 614 can be included. As another example, the third antenna array 608 may generate a focused beam in a single direction, such as a pencil beam, to communicate with a specific device for which the relative location is known. The third antenna array 608 may communicate at a specific frequency (e.g., 2.4 GHz, 5 GHz, or the like).

The third antenna array 608 may include a plurality of directional antenna elements 616 (e.g., patch antennas) and a plurality of front-end modules (FEMs) 612 located between the controller 602 and the plurality of antenna elements 616. In radio frequency (RF) systems, a FEM is positioned between an antenna and a digital baseband section of a wireless system. The FEMs 612 may convert information from the near-zero frequency baseband signals to radio signals that can be received or transmitted over the air. The FEMs 612 may include, for example, an RF or bandpass filter, a power amplifier, a low noise amplifier, a switch, a power detector, a balun, and any other RF components.

In some aspects, the FEMs 612 may include analog phase shifters. In some aspects, analog phase shifters 614 may be located inline between the FEMs 612 and the antenna elements 616. In some aspects, the analog phase shifters 614 may be located at any location between the antenna elements 616 and the controller 602. The router 600 may include a separate analog phase shifter 614 assigned to each antenna element 616. The inclusion of the analog phase shifters 614, relative to digital phase shifters included in the controller 602, utilizes significantly less power and requires less expensive components in the controller 602.

The fourth antenna array 610 may be designed to generate a shaped or focused beam. For example, the fourth antenna array 610 may generate a planar beam as described above. As another example, the fourth antenna array 610 may generate a focused beam in a single direction, such as a pencil beam, to communicate with a specific device for which the relative location is known. The fourth antenna array 610 may communicate at a specific frequency (e.g., 2.4 GHz, 5 GHz, or the like). In some aspects, the fourth antenna array 610 may communicate at a different frequency than the third antenna array 608.

As with the third antenna array 608, the fourth antenna array 610 may include a plurality of directional antenna elements (e.g., patch antennas) and a plurality of front-end modules (FEMs) located between the controller 602 and the plurality of antenna elements. The FEMs may convert information from the near-zero frequency baseband signals to radio signals that can be received or transmitted over the air interface. The FEMs may include, for example, an RF or bandpass filter, a power amplifier, a low noise amplifier, a switch, a power detector, a balun, and any other RF components. The fourth antenna array 610 may also include inline phase shifters 609 with a respective phase shifter 609 for each antenna 611.

As noted above, the FEMs 608, 610 may include analog phase shifters 609, 614. In some aspects, analog phase shifters may be located inline between the FEMs and the antenna elements 611, 616. In some aspects, the analog phase shifters 609, 614 may be located at any location between the antenna elements and the controller 602. The router 600 may include a separate analog phase shifter 609 assigned to each antenna element 611 of the fourth antenna array 610. The inclusion of the analog phase shifters, relative to digital phase shifters which may be included in the controller 602, utilizes significantly less power and requires less expensive components in the controller 602.

The router 600 may operate in a similar manner as the router 500 of FIG. 5A. That is, at least one of the first antenna array 604 and the second antenna array 606 may generate a broadcast signal which is radiated in some or all directions relative to the router 600. For example, the controller 602 may control the first antenna array 604 to generate a first broadcast signal at a first frequency (e.g., 5 GHz), and control the second antenna array 606 to generate a second broadcast signal at a second frequency (e.g., 2 GHz). A user device may receive the broadcast signal and send a return signal to establish a connection with the router 600. The return signal may be used by the controller 602 to determine a relative location of the user device. The controller 602 may then control at least one of the third antenna array 608 or the fourth antenna array 610 to generate a directed beam towards the determined location of the user device. In some aspects, the first and third antenna arrays 604, 608 may communicate at a first frequency (e.g., 5 GHz), and the second and fourth antenna arrays 606, 610 may communicate at a second frequency (e.g., 2 GHz). In that regard, if the first antenna array 604 receives a return signal in response to a broadcast at the first frequency, then the controller 602 may control the third antenna array 608 to generate the directed beam at the first frequency. Furthermore, if the second antenna array 602 receives a return signal in response to a broadcast at the second frequency, then the controller 602 may control the fourth antenna array 610 to generate the directed beam at the second frequency.

As discussed above, at least the third antenna array 608 and the fourth antenna array 610 are designed to generate a focused beam (e.g., a pencil beam). In that regard, the controller 602 may control at least one of the third antenna array 608 and the fourth antenna array 610 to generate a directed beam towards the determined location of the user device. In some situations, the user device may move relative to the router 600. In such situations, the controller 602 may determine the updated location of the user device based on signals received by at least one of the third antenna array 608 and the fourth antenna array 610, provided the movement caused the user device to remain within the region covered by the directed beam. In situations in which the user moves out of the region covered by the beam then the controller 602 may monitor at least one of the first antenna array 604 and the second antenna array 606 for a new return signal and may determine the updated location of the user device based on the new return signal.

In some aspects, the controller 602 may control at least one of the third antenna array 608 and the fourth antenna array 610 to generate a broadcast signal. For example, the controller 602 may control the third antenna array 608 to generate an omni-directional broadcast signal, a planar broadcast signal, or any other shaped broadcast signal. The controller 602 may wait for a return signal from a user device in response to the broadcast signal. In response to receiving a return signal, the controller 602 may determine a location of the user device based on the return signal. The controller 602 may then control the third antenna array 608 to generate a focused beam directed towards the location of the user device.

In some aspects, the controller 602 may alternate between controlling at least one of the third antenna array 608 and the fourth antenna array 610 to generate a directed beam towards a user device and controlling at least one of the first antenna array 604 and the second antenna array 606 to generate a broadcast beam. In response to receiving another return signal in response to the broadcast beam from a second user device, the controller 602 may control at least one of the third antenna array 608 and the fourth antenna array 610 to generate a second directed beam towards the second user device.

In some aspects, if the router is communicating with two or more user devices at the same frequency simultaneously, then the router may switch between communicating with each user device. For example, if two user devices are communicating with the third antenna array 608 then the controller 602 may control the third antenna array 608 to switch between a first directed beam directed towards the location of the first user device and a second directed beam directed towards the location of the second user device. For example, the controller 602 may control the third antenna array 608 to switch between the first directed beam and the second directed beam periodically (e.g., every 0.1 milliseconds, every millisecond, every 10 milliseconds, or other time frame).

In some aspects, if the router 600 is communicating with two or more user devices at the same frequency simultaneously, then the router 600 may cause at least one of the third antenna array 608 and the fourth antenna array 610 to communicate with the user devices simultaneously. For example, if two user devices are communicating with the third antenna array 608, then the controller 602 may control the third antenna array 608 to simultaneously generate a first directed beam directed towards the location of the first user device and a second directed beam directed towards the location of the second user device.

Use of the directed beam generated by the third antenna array 608 and the fourth antenna array 610 provides advantages over conventional routers. In particular, the improvement can be that because the directed beams are focused, the reach of the router 600 is significantly greater than that of conventional routers (e.g., double, triple, or the like). Furthermore, because the beams are focused (rather than omni-directional), much less energy is sent in directions in which no devices are located, thus saving energy. In addition and also because the beams are focused, less noise is received with the communication signal, significantly increasing the signal to noise ratio (SNR), thus improving performance of the router 600.

Figure 7A:
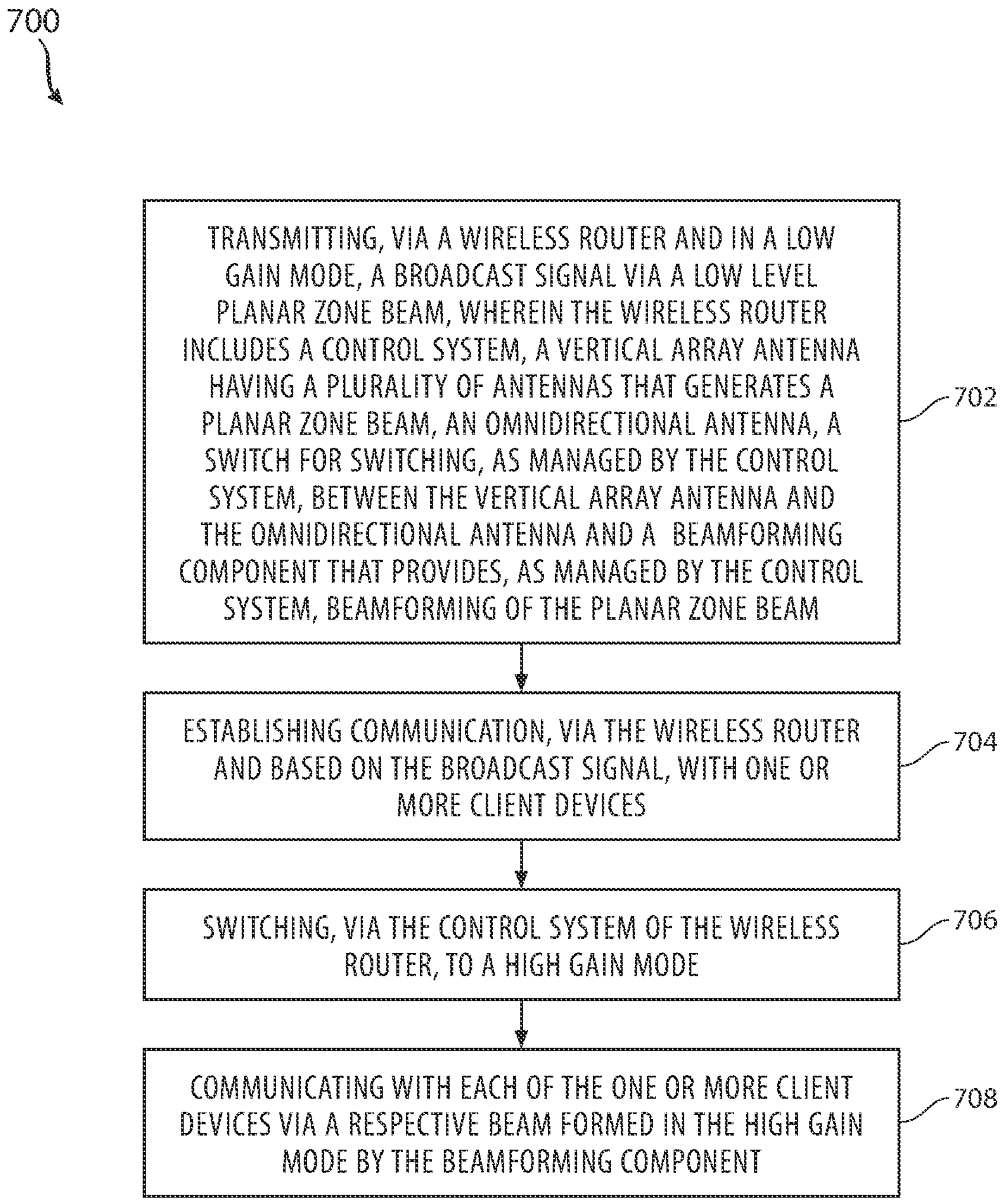
FIGS. 7A-E illustrate various method embodiments.

FIGS. 7A-E illustrate various method embodiments. A method 700 is shown in FIG. 7A that focuses on a process of initially transmitting a broadcast signal from a wireless router in a low gain mode, and then following up once client devices connect by switching to a high gain mode with beamforming on top of the planar zone beam. The method 700 can include one or more steps of transmitting, via a wireless router and in a low gain mode, a broadcast signal via a low-level planar zone beam, wherein the wireless router can include a control system, a vertical array antenna having a plurality of antennas that generates a planar zone beam, an omni-directional antenna, a switch for switching, as managed by the control system, between the vertical array antenna and the omni-directional antenna and a beamforming component that provides, as managed by the control system, beamforming of the planar zone beam (702), establishing communication, via the wireless router and based on the broadcast signal, with one or more client devices (704), switching, via the control system of the wireless router, to a high gain mode (706) and communicating with each of the one or more client devices via a respective beam formed in the high gain mode by the beamforming component (708).

The vertical array antenna 300 can include multiple high gain antennas or antenna elements 304*a*, 304*b* that produce an antenna gain for the planar zone beam of between 12 and 22 dBi. Other values outside of the range are also contemplated. The vertical array antenna 434*a*, 434*b* can include a first vertical array antenna pointed in a first direction and a second vertical array antenna pointed in a second direction. The shape of the vertical array antenna 300 can vary. For example, the array 300 can be configured on a cylinder or cylindrically shaped foundation such that antennas are facing in all directions. Shown in FIG. 4B is a square shape in which one or more sides has a respective vertical antenna array 434*a*, 434*b* that can be used to transmit the planar zone beam. The beam can be fixed in one aspect with various arrays each having a separate fixed configuration or the beam shape can be dynamic and adjustable by the control system 530.

The beamforming component can include a respective analog phase shifter configured inline with a respective antenna of the vertical array antenna is shown in FIG. 6.

The plurality of antennas can include a plurality of high gain antennas which have typically an antenna gain of 11 dBi or greater. The high gain mode can be achieved by using more antennas of the plurality of antennas turned on than in the low gain mode.

The low gain mode can be set by turning off at least some antennas of the plurality of antennas. In another aspect, different fixed antenna arrays can be chosen or the system can switch to different arrays in order to provide the coverage desired. The vertical array antenna can be configured in a generally vertical position within the system.

The omni-directional antenna can have an antenna gain of between 2 and 7 dBi inclusive. The low gain mode or low antenna gain can also be provided via the vertical array antennas 434*a*, 434*b* by shutting down some of the antenna elements to yield the desired gain.

The beamforming component can include a hybrid of analog and digital beamforming of the planar zone beam. For example, analog phase shifters can be integrated into the front-end module and/or analog phase shifters can be configured inline with the individual antenna paths as shown in FIG. 6. The approach can create a larger array of antennas without the need to increase the size of the base chipset and base chipset signal chain support. When the array is connected to the Wi-Fi chipset and controlled by the wireless MAC, the system can switch beamforming on a per client device basis. The disclosed approach increases the efficiency of the wireless spectrum and uses lower transmit power so energy is only sent to the client device that needs data. Broadcast packets can also be transmitted at lower power levels of beamforming so that all the client devices can receive broadcast signals. Then as client devices connect, the system can switch to high gain antenna arrays and use beamforming to focus the signal energy towards the individual client devices.

The wireless router 206 further can include a front-end module as shown in FIG. 6, wherein the beamforming component can include one or more of integrated analog phase shifters in the front-end module and a respective analog phase shifter configured inline with each respective antenna path of the plurality of antennas.

An example system or wireless router can include at least one processor (e.g., the processor 810 shown in FIG. 8) and a non-transitory computer-readable storage medium or device (e.g., the memory 815, 820, 825 and/or 812 of FIG. 8) storing instructions which, when executed by the at least one processor, causes the at least one processor to perform operations including one or more of: transmitting, in a low gain mode, a broadcast signal via a low-level planar zone beam. The wireless router can include a control system, a vertical array antenna having a plurality of antennas that generates a planar zone beam, an omni-directional antenna, a switch for switching, as managed by the control system, between the vertical array antenna and the omni-directional antenna and a beamforming component that provides, as managed by the control system, beamforming of the planar zone beam. The operations can include establishing communication, based on the broadcast signal, with one or more client devices, switching, via the control system of the wireless router, to a high gain mode and communicating with each of the one or more client devices via a respective beam formed in the high gain mode by the beamforming component.

Another embodiment can include a non-transitory computer-readable storage medium or device (e.g., the memory 815, 820, 825 and/or 812 of FIG. 8) storing instructions which, when executed by at least one processor or a wireless router, causes the at least one processor or wireless router to perform operations including one or more of: transmitting, in a low gain mode, a broadcast signal via a low-level planar zone beam. The wireless router can include a control system, a vertical array antenna having a plurality of antennas that generates a planar zone beam, an omni-directional antenna, a switch for switching, as managed by the control system, between the vertical array antenna and the omni-directional antenna and a beamforming component that provides, as managed by the control system, beamforming of the planar zone beam. The operations can include establishing communication, based on the broadcast signal, with one or more client devices, switching, via the control system of the wireless router, to a high gain mode and communicating with each of the one or more client devices via a respective beam formed in the high gain mode by the beamforming component.

Figure 7B:
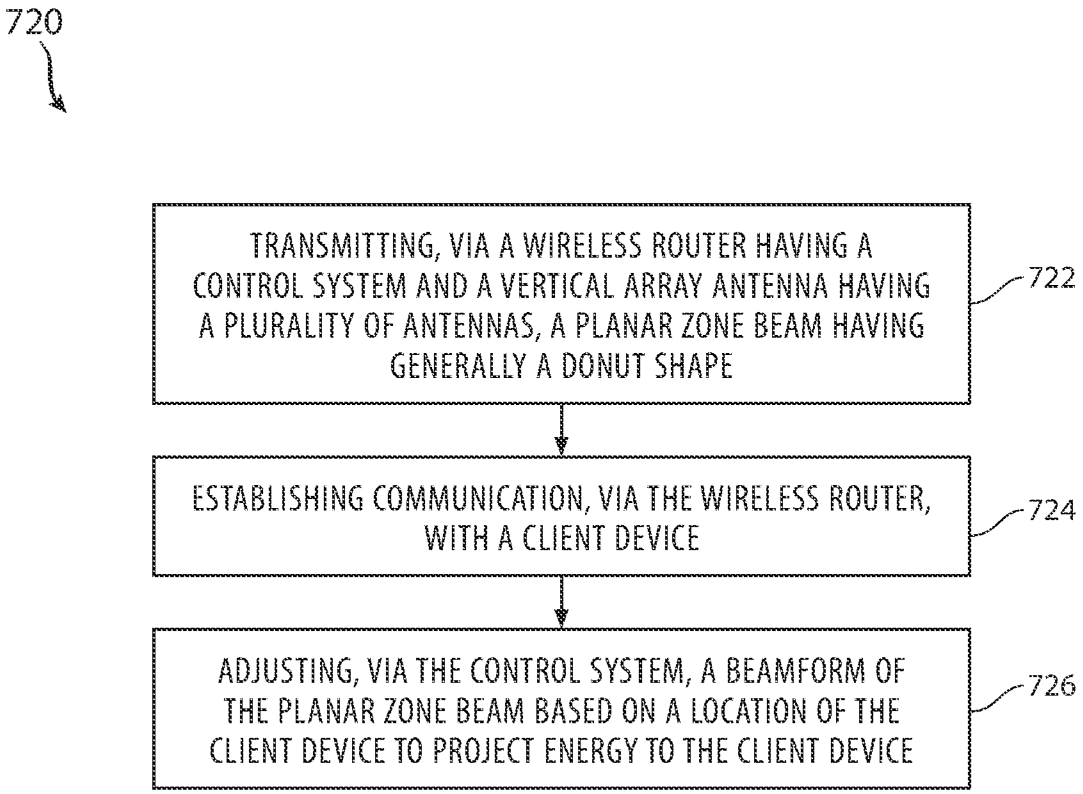

FIG. 7B illustrates another method 720 that is related to adjusting the beamforming process for the vertical array antenna 434*a*, 434*b*. The method 720 can include one or more of transmitting, via a wireless router having a control system and a vertical array antenna having a plurality of antennas, a planar zone beam having generally a donut shape (722), establishing communication, via the wireless router, with a client device (724) and adjusting, via the control system, a beamform of the planar zone beam based on a location of the client device to project energy to the client device (726).

The transmitting step can be performed in a low gain mode such that the broadcast occurs in a low gain mode and the adjusting step can then performed in a high gain mode in order to focus the higher amount of signal energy towards the client devices that start communication with the wireless router 206.

The low gain mode can include an antenna gain of less than or equal to 10 dBi and the high gain mode can include the antenna gain to be equal to or greater than 12 dBi.

The low gain mode can be established by using less antenna elements of the plurality of antennas turned on than in the high gain mode. For example, in the high gain mode, 80-100% of the antenna elements in the vertical array antenna can be used where in the low gain mode less than 80% of the antenna elements can be turned on. Adjusting the beamform of the planar zone beam can be performed in one of the low gain mode or the high gain mode.

An example system or wireless router can include at least one processor (e.g., the processor 810 shown in FIG. 8) and a non-transitory computer-readable storage medium or device (e.g., the memory 815, 820, 825 and/or 812 of FIG. 8) storing instructions which, when executed by the at least one processor, causes the at least one processor to perform operations including one or more of: transmitting, via a vertical array antenna having a plurality of antennas, a planar zone beam having generally a donut shape, establishing communication, via the wireless router, with a client device and adjusting, via a control system, a beamform of the planar zone beam based on a location of the client device to project energy to the client device.

Another embodiment can include a non-transitory computer-readable storage medium or device (e.g., the memory 815, 820, 825 and/or 812 of FIG. 8) storing instructions which, when executed by at least one processor or a wireless router, causes the at least one processor or wireless router to perform operations including one or more of: transmitting, via a vertical array antenna having a plurality of antennas, a planar zone beam having generally a donut shape, establishing communication, via the wireless router, with a client device and adjusting, via a control system, a beamform of the planar zone beam based on a location of the client device to project energy to the client device.

Figure 7C:
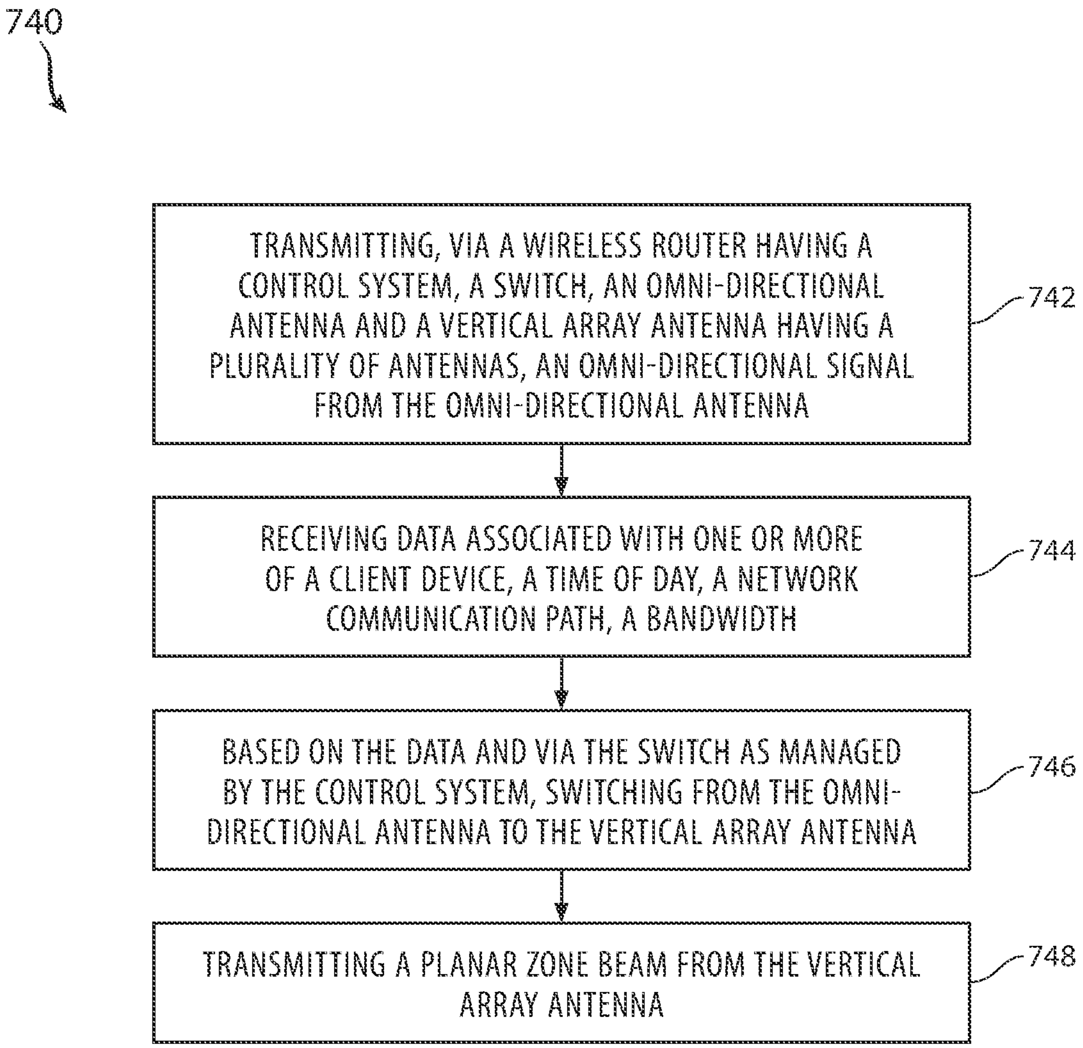

FIG. 7C illustrates another method 740 embodiment. The method 740 can include one or more of transmitting, via a wireless router having a control system, a switch, an omni-directional antenna and a vertical array antenna having a plurality of antennas, an omni-directional signal from the omni-directional antenna (742), receiving data associated with one or more of a client device, a time of day, a network communication path, a bandwidth (744), based on the data and via the switch as managed by the control system, switching from the omni-directional antenna to the vertical array antenna (746) and transmitting a planar zone beam from the vertical array antenna (748). The data can be associated with one or more of a type of network communication path, a bandwidth, a number client devices, a location of one or more client devices, and an output from a machine learning algorithm. The type of network communication path can include one or more of a satellite communication path, a cellular communication path and a wired communication path.

An example system or wireless router can include at least one processor (e.g., the processor 810 shown in FIG. 8) and a non-transitory computer-readable storage medium or device (e.g., the memory 815, 820, 825 and/or 812 of FIG. 8) storing instructions which, when executed by the at least one processor, causes the at least one processor to perform operations including one or more of: transmitting, via a switch, an omni-directional antenna and a vertical array antenna having a plurality of antennas, an omni-directional signal from the omni-directional antenna, receiving data associated with one or more of a client device, a time of day, a network communication path, a bandwidth, based on the data and via the switch as managed by a control system, switching from the omni-directional antenna to the vertical array antenna and transmitting a planar zone beam from the vertical array antenna.

Another embodiment can include a non-transitory computer-readable storage medium or device (e.g., the memory 815, 820, 825 and/or 812 of FIG. 8) storing instructions which, when executed by at least one processor or a wireless router, causes the at least one processor or wireless router to perform operations including one or more of: transmitting, via a wireless router having a control system, a switch, an omni-directional antenna and a vertical array antenna having a plurality of antennas, an omni-directional signal from the omni-directional antenna, receiving data associated with one or more of a client device, a time of day, a network communication path, a bandwidth, based on the data and via the switch as managed by the control system, switching from the omni-directional antenna to the vertical array antenna and transmitting a planar zone beam from the vertical array antenna.

In another aspect, a system can control two or more wireless routers 206, 524, 526, 528 such that a more coordinated coverage area for a multi-story building or other area 522 can be achieved. A system can include (1) a first wireless router including a first control system, a first vertical array antenna having a first plurality of antennas that generates a first planar zone beam, a first omni-directional antenna, a first switch for switching, as managed by the first control system, between the first vertical array antenna and the first omni-directional antenna and a first beamforming component that provides, as managed by the first control system, beamforming of the first planar zone beam and (2) a second wireless router including a second control system, a second vertical array antenna having a second plurality of antennas that generates a second planar zone beam, a second omni-directional antenna, a second switch for switching, as managed by the second control system, between the second vertical array antenna and the second omni-directional antenna and a second beamforming component that provides, as managed by the second control system, beamforming of the second planar zone beam.

A control system 530 can be in communication with the first wireless router and the second wireless router. The control system 530 can switch between the first wireless router 524 and the second wireless router 526 for providing network service to one or more client devices 548, 550. The first wireless router 524 further can include a respective first analog phase shifter configured inline with each antenna of the first plurality of antennas and the second wireless router 528 further can include a respective second analog phase shifter configured inline with each antenna of the second plurality of antennas.

The control system 530 can switch the first vertical array antenna between a low gain mode having a first antenna gain of 10 dBi or less and a high gain mode wherein the first antenna gain is 12 dBi or more. The gain values can vary to be above or below the decibel values.

In another aspect, a system can include a control system 502, a first vertical array antenna 434*a* having a first plurality of antennas that generates a first beam that is fixed, a second vertical array antenna 434*b* having a second plurality of antennas that generates a second beam that is fixed, an omni-directional antenna 606 and a switch for switching, as managed by the control system, between the first vertical array antenna 434*a*, the second vertical array antenna 434*b*, and the omni-directional antenna 606 based on data associated with one or more client devices 548, 550. The first beam and the second beam can be each planar zone beams 430. One or more of the first and second beams also my not be fixed as well but may be dynamic or changeable.

Figure 7D:
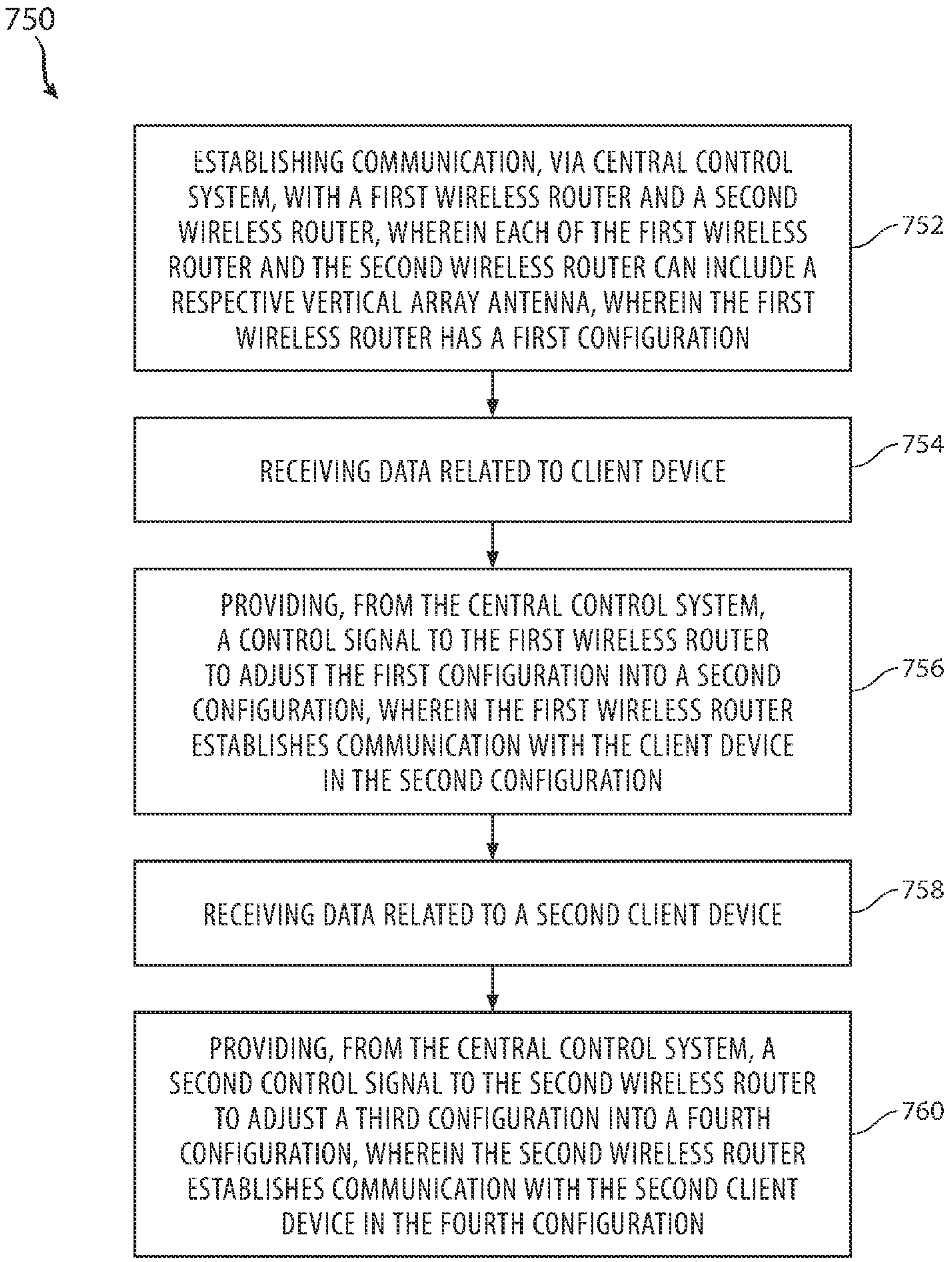

FIG. 7D illustrates a method 750 where there are multiple wireless routers 526, 528 controlled by a central control system 530. The method 750 includes establishing communication, via a central control system 530, with a first wireless router 526 and a second wireless router 528, wherein each of the first wireless router 526 and the second wireless router 528 can include a respective vertical array antenna 434*a*, 434*b*, wherein the first wireless router 526 has a first configuration (752), receiving data related to a client device (754) and providing, from the central control system 530, a control signal to the first wireless router 526 to adjust the first configuration into a second configuration, wherein the first wireless router 526 establishes communication with the client device in the second configuration (756).

The second wireless router 528 can have a third configuration. The method further can include receiving data related to a second client device (758) and providing, from the central control system 530, a second control signal to the second wireless router 528 to adjust the third configuration into a fourth configuration, wherein the second wireless router establishes communication with the second client device in the fourth configuration (760). The first configuration can include parameters associated with a gain mode, a use of one or more of a vertical array antenna and/or an omni-directional antenna, and a beamforming component.

An example system can include at least one processor (e.g., the processor 810 shown in FIG. 8) and a non-transitory computer-readable storage medium or device (e.g., the memory 815, 820, 825 and/or 812 of FIG. 8) storing instructions which, when executed by the at least one processor, causes the at least one processor to perform operations including one or more of: establishing communication, via a central control system 530, with a first wireless router 526 and a second wireless router 528. Each of the first wireless router 526 and the second wireless router 528 can include a respective vertical array antenna 434*a*, 434*b*. The first wireless router 526 can have a first configuration. The operations can further include receiving data related to a client device and providing, from the central control system 530, a control signal to the first wireless router 526 to adjust the first configuration into a second configuration. The first wireless router 526 can establish communication with the client device in the second configuration. The operations further can include receiving data related to a second client device and providing, from the central control system 530, a second control signal to the second wireless router 528 to adjust the third configuration into a fourth configuration. The second wireless router can establish communication with the second client device in the fourth configuration. The first configuration can include parameters associated with a gain mode, a use of one or more of a vertical array antenna and/or an omni-directional antenna, and a beamforming component.

Another embodiment can include a non-transitory computer-readable storage medium or device (e.g., the memory 815, 820, 825 and/or 812 of FIG. 8) storing instructions which, when executed by at least one processor or a wireless router, causes the at least one processor or wireless router to perform operations including one or more of: establishing communication, via a central control system 530, with a first wireless router 526 and a second wireless router 528. Each of the first wireless router 526 and the second wireless router 528 can include a respective vertical array antenna 434*a*, 434*b*. The first wireless router 526 can have a first configuration. The operations can further include receiving data related to a client device and providing, from the central control system 530, a control signal to the first wireless router 526 to adjust the first configuration into a second configuration. The first wireless router 526 can establish communication with the client device in the second configuration. The operations further can include receiving data related to a second client device and providing, from the central control system 530, a second control signal to the second wireless router 528 to adjust the third configuration into a fourth configuration. The second wireless router can establish communication with the second client device in the fourth configuration.

Figure 7E:
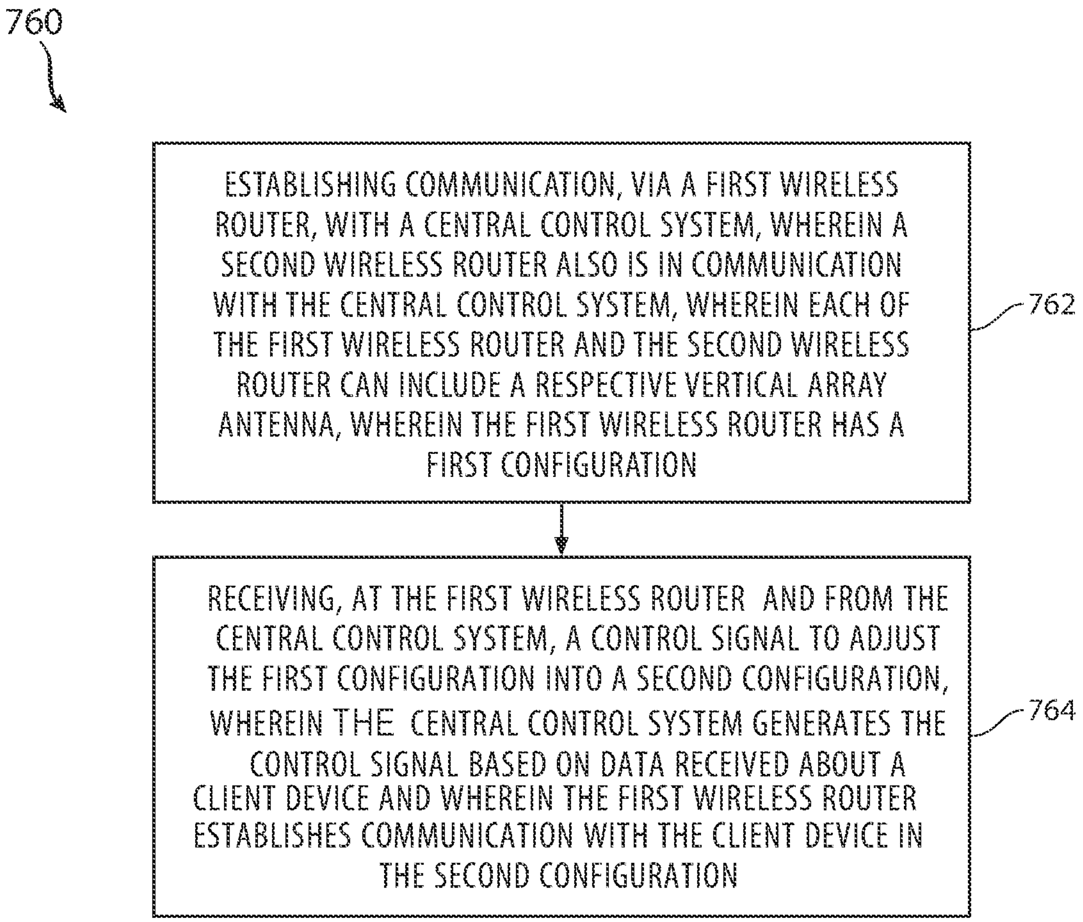

FIG. 7E illustrates another method from the standpoint of a wireless router 206 that is controlled by a central control system 530 with at least one other router as well. The method 760 includes establishing communication, via a first wireless router 526, with a central control system 530, wherein a second wireless router 528 also is in communication with the central control system 530, wherein each of the first wireless router 526 and the second wireless router 528 can include a respective vertical array antenna, wherein the first wireless router 526 has a first configuration (762) and receiving, at the first wireless router 526 and from the central control system 530, a control signal to adjust the first configuration into a second configuration, wherein the central control system 530 generates the control signal based on data received about a client device and wherein the first wireless router 526 establishes communication with the client device in the second configuration (764).

An example system can include at least one processor (e.g., the processor 810 shown in FIG. 8) and a non-transitory computer-readable storage medium or device (e.g., the memory 815, 820, 825 and/or 812 of FIG. 8) storing instructions which, when executed by the at least one processor, causes the at least one processor to perform operations including one or more of: establishing communication, via a first wireless router 526, with a central control system 530. A second wireless router 528 also can be in communication with the central control system 530 and each of the first wireless router 526 and the second wireless router 528 can include a respective vertical array antenna. The first wireless router 526 can have a first configuration. The operations can include receiving, at the first wireless router 526 and from the central control system 530, a control signal to adjust the first configuration into a second configuration. The central control system 530 can generate the control signal based on data received about a client device and the first wireless router 526 can establish communication with the client device in the second configuration.

Another embodiment can include a non-transitory computer-readable storage medium or device (e.g., the memory 815, 820, 825 and/or 812 of FIG. 8) storing instructions which, when executed by at least one processor or a wireless router, causes the at least one processor or wireless router to perform operations including one or more of: establishing communication, via a first wireless router 526, with a central control system 530. A second wireless router 528 also can be in communication with the central control system 530 and each of the first wireless router 526 and the second wireless router 528 can include a respective vertical array antenna. The first wireless router 526 can have a first configuration. The operations can include receiving, at the first wireless router 526 and from the central control system 530, a control signal to adjust the first configuration into a second configuration. The central control system 530 can generate the control signal based on data received about a client device and the first wireless router 526 can establish communication with the client device in the second configuration.

The data that may be used to adjust the configuration of one or more wireless routers can vary. Note that in FIG. 2, the communication path to the ground network 108 can vary between a satellite path, a wired path 110 and/or a cellular path such as through a hotspot or mobile device having a hotspot capability. These various communication paths can provide different bandwidth capabilities. In a home 103 as is shown in FIG. 2, there can be a single service such as a wired Internet access service. However, in some cases such as an apartment building or office building, different wireless routers as are shown in FIG. 5C might be associated with different Internet service offerings or communication paths. Some might have contracts for wired Internet access 110 while others might use endpoint terminals 102 to receive satellite 104 Internet access. In a context where multiple communication paths are available for a set of wireless routers 524, 526, 528, the central control system 530 can utilize the information to provide enhanced energy savings and efficiency in dynamically adjusting the various configurations of different wireless routers 524, 526, 528. In some cases, a wired 110 Internet service may go down. The central control system 530 could switch all the users to the satellite 104 service through the endpoint terminal 102. The differences in network bandwidth or other characteristics between one network and another can cause the central control system 530 to make other adjustments in terms of beamforming, choice of routers, choice of antennas or antenna arrays selected from a respective router, choice of network or other decisions. In other cases, the bandwidth available through the satellite 104 service might be much greater than the ground-based service 108. The central control system 530 might switch or send control signals to adjust the various settings of the respective wireless routers 524, 526, 528 in order to move more client devices onto wireless routers 524, 526, 528 that have modems with access to the satellite 104 service. The central control system 530 can thus load balance or make adjustments between Internet service providers.

New hardware configurations might be implemented in terms of the modem capabilities to enable access to be switched for individual client devices communicating with a respective wireless router 524, 526, 528 such that the ultimate Internet access is gained through different communication paths. Thus, the central control system 530 not only controls beamforming and other capabilities of the wireless routers 524, 526, 528 but can also control the modem(s) 332 that the wireless routers 524, 526, 528 are connected to in order to decide which communication path should be used on a client device basis, wireless router basis, floor basis, time of day basis or bandwidth usage basis and so forth. The modem 332 can be updated to include multiple communication path capabilities plus the capability of recognizing or distinguishing data streams from individual client devices. Further, the modem 332 can further be capable of receiving a control signal which can instruct the modem 332 to route, for example, a first data stream from a first client device to a first communication path (such as a satellite path 104) and a second data stream from a second client device to a second communication path (such as a wired communication path 110). Where different entities have different accounts with different network providers, costs can be distributed or adjusted where other users are accessing a particular user's network access account and quality of service agreements could also be maintained for the primary owner of the account when other users are switched over to using that account.

Figure 8:
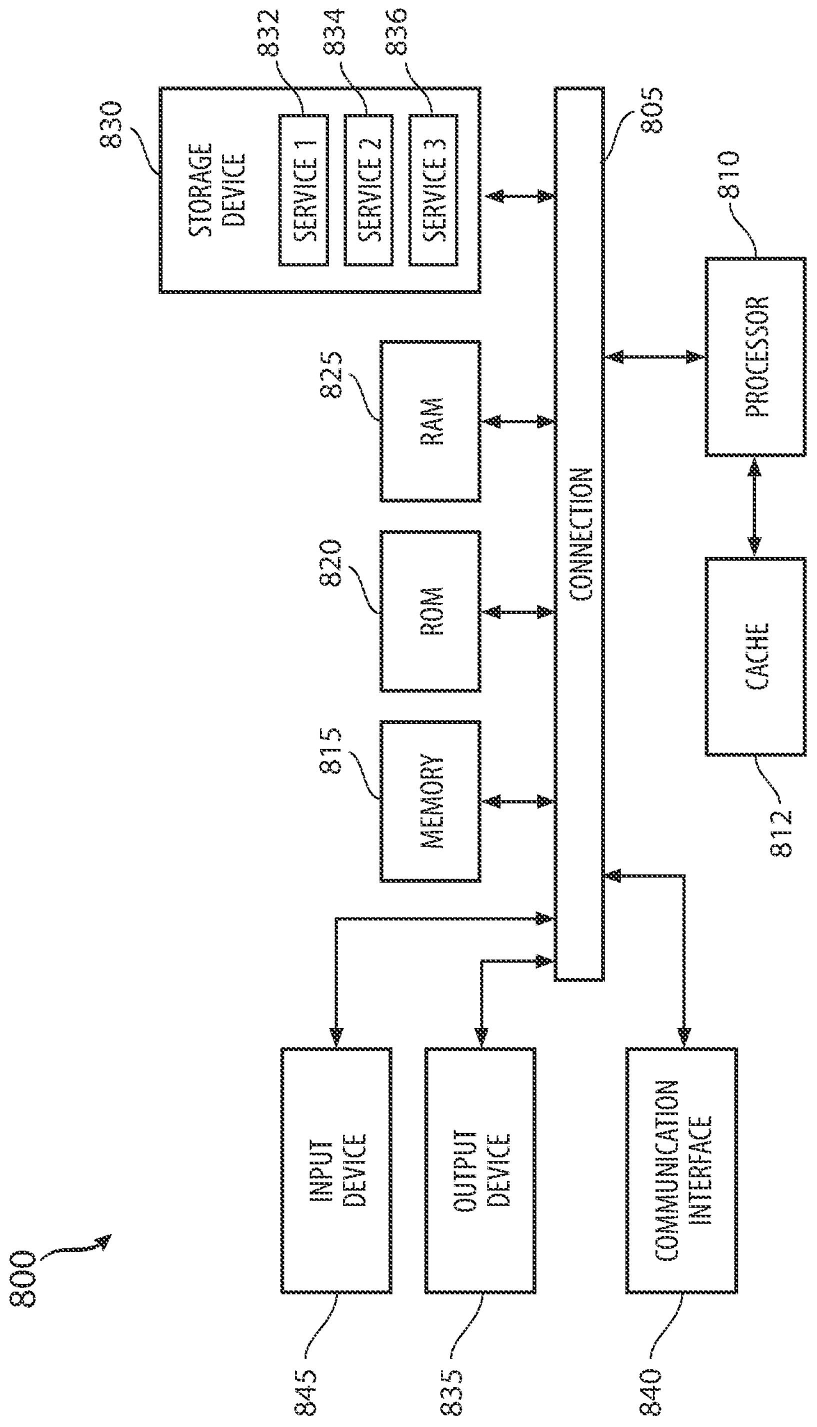
FIG. 8 illustrates an example system that can be implemented in one or more components disclosed herein.

FIG. 8 illustrates example computer device that can be used in connection with any of the systems or components of the endpoint terminal 102, the satellite 104, the gateway 106, a modem 332, a central control system 530, or other components disclosed herein. In one example, FIG. 8 illustrates a computing system 800 including components in electrical communication with each other using a connection 805, such as a bus. System 800 includes a processing unit (CPU or processor) 810 and a system connection 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this manner, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service, such as service 1—832, service 2—834, and service 3—836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the device 800. The communications interface 840 can generally govern and manage the user input and system output. For example, the communication interface 840 can be an input port or an input/output port for communication with other devices or a network. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include services 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

In some aspects, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

Clauses of this disclosure can include:

Clause 1. A system comprising: a control system; a vertical array antenna having a plurality of antennas that generates a planar zone beam; an omni-directional antenna; a switch for switching, as managed by the control system, between the vertical array antenna and the omni-directional antenna; and a beamforming component that provides, as managed by the control system, beamforming of the planar zone beam.

Clause 2. The system of clause 1, wherein the vertical array antenna comprises multiple high gain antennas that produce an antenna gain for the planar zone beam of between 12 and 22 dBi.

Clause 3. The system of clause 1 or any previous clause, wherein the vertical array antenna comprises a first vertical array antenna pointed in a first direction and a second vertical array antenna pointed in a second direction.

Clause 4. The system of clause 1 or any previous clause, wherein the beamforming component comprises a respective analog phase shifter configured inline with a respective antenna of the vertical array antenna.

Clause 5. The system of clause 1 or any previous clause, wherein the plurality of antennas comprises a plurality of high gain antennas.

Clause 6. The system of clause 1 or any previous clause, wherein the vertical array antenna is switched between a high gain mode and a low gain mode, wherein the high gain mode has more antennas of the plurality of antennas turned on than in the low gain mode.

Clause 7. The system of clause 6 or any previous clause, wherein switching to the low gain mode comprises turning off at least some antennas of the plurality of antennas.

Clause 8. The system of clause 1 or any previous clause, wherein the vertical array antenna is configured in a generally vertical position within the system.

Clause 9. The system of clause 1 or any previous clause, wherein the omni-directional antenna has an antenna gain of between 2 and 7 dBi inclusive.

Clause 10. The system of clause 1, wherein the beamforming component comprises a hybrid of analog and digital beamforming of the planar zone beam.

Clause 11. The system of clause 1 or any previous clause, further comprising: a front-end module, wherein the beamforming component comprises one or more of integrating analog phase shifters into the front-end module and configuring a respective analog phase shifter inline with each respective antenna path of the plurality of antennas.

Clause 12. A method comprising: transmitting, via a wireless router and in a low gain mode, a broadcast signal via a low-level planar zone beam, wherein the wireless router comprises a control system, a vertical array antenna having a plurality of antennas that generates a planar zone beam, an omni-directional antenna, a switch for switching, as managed by the control system, between the vertical array antenna and the omni-directional antenna and a beamforming component that provides, as managed by the control system, beamforming of the planar zone beam; establishing communication, via the wireless router and based on the broadcast signal, with one or more client devices; switching, via the control system of the wireless router, to a high gain mode; and communicating with each of the one or more client devices via a respective beam formed in the high gain mode by the beamforming component.

Clause 13. The method of clause 12, wherein the vertical array antenna comprises multiple high gain antennas that produce an antenna gain for the planar zone beam of between 12 and 22 dBi.

Clause 14. The method of any of clauses 12-13, wherein the vertical array antenna comprises a first vertical array antenna pointed in a first direction and a second vertical array antenna pointed in a second direction.

Clause 15. The method of any of clauses 12-14, wherein the beamforming component comprises a respective analog phase shifter configured inline with a respective antenna of the vertical array antenna.

Clause 16. The method of any of clauses 12-15, wherein the plurality of antennas comprises a plurality of high gain antennas.

Clause 17. The method of any of clauses 12-16, wherein the high gain mode has more antennas of the plurality of antennas turned on than in the low gain mode.

Clause 18. The method of any of clauses 12-17, wherein the low gain mode is set by turning off at least some antennas of the plurality of antennas.

Clause 19. The method of any of clauses 12-18, wherein the vertical array antenna is configured in a generally vertical position within the wireless router.

Clause 20. The method of any of clauses 12-19, wherein the omni-directional antenna has an antenna gain of between 2 and 7 dBi inclusive.

Clause 21. The method of any of clauses 12-20, wherein the beamforming component comprises a hybrid of analog and digital beamforming of the planar zone beam.

Clause 22. The method of any of clauses 12-21, wherein the wireless router further comprises a front-end module, wherein the beamforming component comprises one or more of integrating analog phase shifters into the front-end module and configuring a respective analog phase shifter inline with each respective antenna path of the plurality of antennas.

Clause 23. A system comprising: at least one processor; a control system in communication with the at least one processor; a vertical array antenna having a plurality of antennas that generates a planar zone beam; an omni-directional antenna; a switch for switching, as managed by the control system, between the vertical array antenna and the omni-directional antenna; a beamforming component that provides, as managed by the control system, beamforming of the planar zone beam; and a computer-readable storage device storing instructions which, when executed by the at least one processor, cause the at least one processor to perform operations comprising: transmitting, in a low gain mode, a broadcast signal via a low-level planar zone beam; establishing communication, based on the broadcast signal, with one or more client devices; switching, via the control system, to a high gain mode; and communicating with each of the one or more client devices via a respective beam formed in the high gain mode by the beamforming component.

Clause 24. A method comprising: transmitting, via a wireless router having a control system and a vertical array antenna having a plurality of antennas, a planar zone beam having generally a donut shape; establishing communication, via the wireless router, with a client device; and adjusting, via the control system, a beamform of the planar zone beam based on a location of the client device to project energy to the client device.

Clause 25. The method of clause 24, wherein the transmitting is performed in a low gain mode and the adjusting is performed in a high gain mode.

Clause 26. The method of any of clauses 24-25, wherein the low gain mode comprises an antenna gain of less than or equal to 10 dBi and the high gain mode comprises the antenna gain to be equal to or greater than 12 dBi.

Clause 27. The method of any of clauses 24-26, wherein the low gain mode has less antenna elements of the plurality of antennas turned on than in the high gain mode.

Clause 28. The method of any of clauses 24-27, wherein adjusting the beamform of the planar zone beam is performed in one of a low gain mode or a high gain mode.

Clause 29. The method of any of clauses 24-28, wherein the low gain mode has a lower number of antenna elements turned on by the control system than the high gain mode.

Clause 30. A system comprising: at least one processor; a control system; a vertical array antenna having a plurality of antennas; and a computer-readable storage device storing instructions which, when executed by the at least one processor, cause the at least one processor to perform operations comprising: transmitting, via the control system and the vertical array antenna, a planar zone beam having generally a donut shape; establishing communication with a client device; and adjusting, via the control system, a beamform of the planar zone beam based on a location of the client device to project energy to the client device.

Clause 31. A method comprising: transmitting, via a wireless router having a control system, a switch, an omni-directional antenna and a vertical array antenna having a plurality of antennas, an omni-directional signal from the omni-directional antenna; receiving data associated with one or more of a client device, a time of day, a network communication path, a bandwidth; based on the data and via the switch as managed by the control system, switching from the omni-directional antenna to the vertical array antenna; and transmitting a planar zone beam from the vertical array antenna.

Clause 32. The method of clause 31, wherein the data is associated with one or more of a type of network communication path, a bandwidth, a number of client devices, a location of one or more client devices, and an output from a machine learning algorithm.

Clause 33. The method of any of clauses 31-32, wherein the type of network communication path comprises one or more of a satellite communication path, a cellular communication path and a wired communication path.

Clause 34. A system comprising: at least one processor; a control system; an omni-directional antenna; a vertical array antenna having a plurality of antennas; and a computer-readable storage device storing instructions which, when executed by the at least one processor, cause the at least one processor to perform operations comprising: transmitting an omni-directional signal from the omni-directional antenna; receiving data associated with one or more of a client device, a time of day, a network communication path, a bandwidth; based on the data and as managed by the control system, switching from the omni-directional antenna to the vertical array antenna; and transmitting a planar zone beam from the vertical array antenna.

Clause 35. A system comprising: a first wireless router comprising a first control system, a first vertical array antenna having a first plurality of antennas that generates a first planar zone beam, a first omni-directional antenna, a first switch for switching, as managed by the first control system, between the first vertical array antenna and the first omni-directional antenna and a first beamforming component that provides, as managed by the first control system, beamforming of the first planar zone beam; a second wireless router comprising a second control system, a second vertical array antenna having a second plurality of antennas that generates a second planar zone beam, a second omni-directional antenna, a second switch for switching, as managed by the second control system, between the second vertical array antenna and the second omni-directional antenna and a second beamforming component that provides, as managed by the second control system, beamforming of the second planar zone beam; a control system in communication with the first wireless router and the second wireless router, wherein the control system switches between the first wireless router and the second wireless router for providing network service to one or more client devices.

Clause 36. The system of clause 35, wherein the first wireless router further comprises a respective first analog phase shifter configured inline with each antenna of the first plurality of antennas and the second wireless router further comprises a respective second analog phase shifter configured inline with each antenna of the second plurality of antennas.

Clause 37. The system of any of clauses 35-36, where the control system switches the first vertical array antenna between a low gain mode having a first antenna gain of 10 dBi or less and a high gain mode wherein the first antenna gain is 12 dBi or more.

Clause 38. A system comprising: a control system; a first vertical array antenna having a first plurality of antennas that generates a first beam that is fixed; a second vertical array antenna having a second plurality of antennas that generates a second beam that is fixed; an omni-directional antenna; and a switch for switching, as managed by the control system, between the first vertical array antenna, the second vertical array antenna, and the omni-directional antenna based on data associated with one or more client devices.

Clause 39. The system of clause 38, wherein the first beam and the second beam are each planar zone beams.

Clause 40. A method comprising: establishing communication, via a central control system, with a first wireless router and a second wireless router, wherein each of the first wireless router and the second wireless router comprises a respective vertical array antenna, wherein the first wireless router has a first configuration; receiving data related to a client device; and providing, from the central control system, a control signal to the first wireless router to adjust the first configuration into a second configuration, wherein the first wireless router establishes communication with the client device in the second configuration.

Clause 41. The method of clause 40, wherein the second wireless router has a third configuration, the method further comprising: receiving data related to a second client device; and providing, from the central control system, a second control signal to the second wireless router to adjust the third configuration into a fourth configuration, wherein the second wireless router establishes communication with the second client device in the fourth configuration.

Clause 42. The method of clause 40, wherein the first configuration comprises parameters associated with a gain mode, a use of one or more of a vertical array antenna and/or an omni-directional antenna, and a beamforming component.

Clause 43. A system comprising: at least one processor; a control system in communication with the at least one processor; and a computer-readable storage device storing instructions which, when executed by the at least one processor, cause the at least one processor to perform operations comprising: establishing communication, via the control system, with a first wireless router and a second wireless router, wherein each of the first wireless router and the second wireless router comprises a respective vertical array antenna, wherein the first wireless router has a first configuration; receiving data related to a client device; and providing, from the control system, a control signal to the first wireless router to adjust the first configuration into a second configuration, wherein the first wireless router establishes communication with the client device in the second configuration.

Clause 44. A method comprising: establishing communication, via a first wireless router, with a central control system, wherein a second wireless router also is in communication with the central control system, wherein each of the first wireless router and the second wireless router comprises a respective vertical array antenna, wherein the first wireless router has a first configuration; and receiving, at the first wireless router and from the central control system, a control signal to adjust the first configuration into a second configuration, wherein the central control system generates the control signal based on data received about a client device and wherein the first wireless router establishes communication with the client device in the second configuration.

Clause 45. A system comprising: at least one processor; a control system in communication with the at least one processor; a first wireless router in communication with the control system; and a computer-readable storage device storing instructions which, when executed by the at least one processor, cause the at least one processor to perform operations comprising: establishing communication, via the first wireless router with the control system, wherein a second wireless router also is in communication with the control system, wherein each of the first wireless router and the second wireless router comprises a respective vertical array antenna, wherein the first wireless router has a first configuration; and receiving, at the first wireless router and from the control system, a control signal to adjust the first configuration into a second configuration, wherein the control system generates the control signal based on data received about a client device and wherein the first wireless router establishes communication with the client device in the second configuration.

We claim:

1. A method comprising:

transmitting, via a wireless router and in a low gain mode, a broadcast signal via a low-level planar zone beam, wherein the wireless router comprises a control system, a vertical array antenna having a plurality of antennas that generates a planar zone beam, an omni-directional antenna, a switch for switching, as managed by the control system, between the vertical array antenna and the omni-directional antenna and a beamforming component that provides, as managed by the control system, beamforming of the planar zone beam;

establishing communication, via the wireless router and based on the broadcast signal, with one or more client devices;

switching, via the control system of the wireless router, to a high gain mode; and communicating with each of the one or more client devices via a respective beam formed in the high gain mode by the beamforming component.

2. The method of claim 1, wherein the vertical array antenna comprises multiple high gain antennas that produce an antenna gain for the planar zone beam of between 12 and 22 dBi.

3. The method of claim 1, wherein the vertical array antenna comprises a first vertical array antenna pointed in a first direction and a second vertical array antenna pointed in a second direction.

4. The method of claim 1, wherein the beamforming component comprises a respective analog phase shifter configured inline with a respective antenna of the vertical array antenna.

5. The method of claim 1, wherein the plurality of antennas comprises a plurality of high gain antennas.

6. The method of claim 1, wherein the high gain mode has more antennas of the plurality of antennas turned on than in the low gain mode.

7. The method of claim 6, wherein the low gain mode is set by turning off at least some antennas of the plurality of antennas.

8. The method of claim 1, wherein the vertical array antenna is configured in a generally vertical position within the wireless router.

9. The method of claim 1, wherein the omni-directional antenna has an antenna gain of between 2 and 7 dBi inclusive.

10. The method of claim 1, wherein the beamforming component comprises a hybrid of analog and digital beamforming of the planar zone beam.

11. The method of claim 1, wherein the wireless router further comprises a front-end module, wherein the beamforming component comprises one or more of integrating analog phase shifters into the front-end module and configuring a respective analog phase shifter inline with each respective antenna path of the plurality of antennas.

12. A system comprising:

a control system;

a vertical array antenna having a plurality of antennas and configured to generate a planar zone beam;

an omni-directional antenna;

a switch configured to switch, as managed by the control system, between the vertical array antenna and the omni-directional antenna; and a beamforming component configured to provide, as managed by the control system, beamforming of the planar zone beam, wherein the control system is configured to:

transmit, in a low gain mode, of a broadcast signal via a low-level planar zone beam;

establish communication, based on the broadcast signal, with one or more client devices;

switch to a high gain mode; and communicate with each of the one or more client devices via a respective beam formed in the high gain mode by the beamforming component.

13. The system of claim 12, wherein the vertical array antenna comprises multiple high gain antennas that produce an antenna gain for the planar zone beam of between 12 and 22 dBi.

14. The system of claim 12, wherein the vertical array antenna comprises a first vertical array antenna pointed in a first direction and a second vertical array antenna pointed in a second direction.

15. The system of claim 12, wherein the beamforming component comprises a respective analog phase shifter configured inline with a respective antenna of the vertical array antenna.

16. The system of claim 12, wherein the plurality of antennas comprises a plurality of high gain antennas.

17. The system of claim 12, wherein, in the high gain mode, more antennas of the plurality of antennas are turned on than in the low gain mode.

18. The system of claim 17, wherein the low gain mode is set by turning off at least some antennas of the plurality of antennas.

19. The system of claim 12, wherein the vertical array antenna is configured in a generally vertical position within the system.

20. The system of claim 12, wherein the omni-directional antenna has an antenna gain of between 2 and 7 dBi inclusive.

21. The system of claim 12, wherein the beamforming component comprises a hybrid of analog and digital beamforming of the planar zone beam.

22. The system of claim 21, further comprising a front-end module, wherein the beamforming component comprises one or more of: (i) integrating analog phase shifters into the front-end module, and (ii) configuring a respective analog phase shifter inline with each respective antenna path of the plurality of antennas.

* * * * *